US012455218B2

(12) United States Patent
Lee et al.

(10) Patent No.: US 12,455,218 B2
(45) Date of Patent: Oct. 28, 2025

(54) METHODS AND COMPOSITIONS FOR REVERSING PLATELET CLUMPING

(71) Applicant: Truvian Sciences, Inc., San Diego, CA (US)

(72) Inventors: Florence Y. Lee, San Diego, CA (US); Renee L Higgins, Santee, CA (US); Jeffrey A. Hawkins, San Marcos, CA (US); Dena C. Marrinucci, San Diego, CA (US)

(73) Assignee: Truvian Sciences, Inc., San Diego, CA (US)

( * ) Notice: Subject to any disclaimer, the term of this patent is extended or adjusted under 35 U.S.C. 154(b) by 930 days.

(21) Appl. No.: 17/608,458

(22) PCT Filed: May 8, 2020

(86) PCT No.: PCT/US2020/032130
§ 371 (c)(1),
(2) Date: Nov. 2, 2021

(87) PCT Pub. No.: WO2020/227643
PCT Pub. Date: Nov. 12, 2020

(65) Prior Publication Data
US 2022/0214253 A1 Jul. 7, 2022

Related U.S. Application Data

(60) Provisional application No. 62/845,807, filed on May 9, 2019.

(51) Int. Cl.
G01N 1/28 (2006.01)
G01N 1/38 (2006.01)
G01N 33/86 (2006.01)

(52) U.S. Cl.
CPC .............. *G01N 1/38* (2013.01); *G01N 1/286* (2013.01); *G01N 33/86* (2013.01)

(58) Field of Classification Search
CPC .......... G01N 1/38; G01N 1/286; G01N 33/86
See application file for complete search history.

(56) References Cited

U.S. PATENT DOCUMENTS 4,788,139 A 11/1988 Ryan
5,453,359 A * 9/1995 Gargan ................. C07K 14/75
530/389.3

(Continued)

FOREIGN PATENT DOCUMENTS

WO       2017165630 A1     9/2017
WO    WO 2017/190192 A1   11/2017

(Continued)

OTHER PUBLICATIONS

Lassale et al. ("Elements of the complete blood count associated with cardiovascular disease incidence: Findings from the EPIC-NL cohort study," Scientific REPortS (2018) 8:3290) (Year: 2018).*

(Continued)

*Primary Examiner* — Jill A Warden
*Assistant Examiner* — Michael Stanley Gzybowski
(74) *Attorney, Agent, or Firm* — Snell & Wilmer, L.L.P.; April Wurster

(57) ABSTRACT

Provided herein are methods and related compositions and kits for dissolution of platelet clumps formed in collected blood samples. The present methods, compositions and kits are useful for improving blood sample quality and blood assay accuracy in a lab setting, especially in preventing misdiagnosis such as pseudothrombocytopenia or pseudoleukocytosis.

17 Claims, 11 Drawing Sheets

(56) References Cited

U.S. PATENT DOCUMENTS

| | | |
|---|---|---|
| 6,872,572 B2 | 3/2005 | Brady |
| 9,176,112 B2 | 11/2015 | Zhang et al. |
| 10,568,317 B2 | 2/2020 | Desharnais et al. |
| D936,856 S | 11/2021 | Hawkins et al. |
| D954,295 S | 6/2022 | Hawkins et al. |
| D959,019 S | 7/2022 | Hawkins et al. |
| D960,386 S | 8/2022 | Hawkins et al. |
| D968,643 S | 11/2022 | Hawkins et al. |
| 11,638,918 B2 | 5/2023 | Kleinemolen et al. |
| 2011/0152202 A1* | 6/2011 | Du Clos ................. A61P 33/06 514/4.9 |
| 2011/0312015 A1 | 12/2011 | Velaskar |
| 2013/0273584 A1* | 10/2013 | Masci .................... G01N 33/86 422/547 |
| 2014/0185031 A1 | 7/2014 | Zhang et al. |
| 2015/0079655 A1* | 3/2015 | Laugharn, Jr. ........... G01N 1/34 435/306.1 |
| 2015/0362509 A1 | 12/2015 | Woodworth |
| 2017/0023446 A1 | 1/2017 | Rietveld et al. |
| 2018/0352806 A1 | 12/2018 | Desharnais et al. |
| 2020/0064254 A1 | 2/2020 | Vanderklein et al. |

FOREIGN PATENT DOCUMENTS

| | | | | |
|---|---|---|---|---|
| WO | WO-2018145005 A1 * | 8/2018 | ........... | A01N 1/0263 |
| WO | 2020176607 A1 | 9/2020 | | |
| WO | 2020227643 A1 | 11/2020 | | |

OTHER PUBLICATIONS

EP Patrial Search Report in European Application No. 20802739, dated Mar. 16, 2023, 14 pages.

Woerner and Bross, "Platelet Aggregation and the Release Reaction Induced by ionophores for Divalent Cations," *Thromb. Res.* (1975), 6(4):295-305, Pergamon Press, Inc.

CA: Office Action in Ca Application No. 3,138,184 dated Jan. 22, 2024 (4 pages).

EP: Examination Report in EP Application No. 20802739 dated Mar. 11, 2024 (7 pages).

EP: Extended Search Report in EP Application No. 20802739 dated Jun. 16, 2023 (11 pages).

MX: Office Action in MX Application No. MX/a/2021/013666 dated Aug. 1, 2024 (14 pages).

Theranos' Elizabeth Holmes Speaks at AACC Meeting. "Theranos Science & Technology: The Miniaturization of Laboratory Testing," American Association for Clinical Chemistry [Video] [Screen captures from video retrieved on the Internet at URL: https://www.mpo-mag.com/contents/view_videos/2016-08-02/theranos-elizabeth-holmes-speaks-at-aacc-meeting/] pp. 1-6 (Aug. 2, 2016).

Giroux et al., "Influence of calcium ions in the flow cytometric analysis of human CD8-positive cells," 62A(1):61-64 (Nov. 2004) https://doi.org/10.1002/cyto.a.20084.

* cited by examiner

METHODS AND COMPOSITIONS FOR REVERSING PLATELET CLUMPING

CROSS-REFERENCE TO RELATED APPLICATIONS

This application is a 35 USC § 371 National Stage application of International Application No. PCT/US2020/032130 filed May 8, 2020, now pending; which claims the benefit under 35 USC § 119 (e) to U.S. Application Ser. No. 62/845,807 filed May 9, 2019, now expired. The disclosure of each of the prior applications is considered part of and is incorporated by reference in the disclosure of this application.

BACKGROUND OF THE DISCLOSURE

Field

The present invention relates generally to platelet aggregation and more specifically to methods and compositions for reversing and/or inhibiting platelet clumping in a blood sample.

Background Information

Platelet clumping is a common laboratory artefact that complicates or precludes reporting of platelet count. Most hematology analyses count the number of platelets by sizing them. Particles (e.g., blood cells) outside a particular size range are disregarded by the platelet channel and not counted as platelets. Thus, when platelets in a blood sample clump together due to the artefact, the instruments exclude these clumps of platelets and produce a spuriously low platelet count, known as pseudothrombocytopenia (PTCP), leading to false diagnosis, unnecessary investigations, patient anxiety, and even unnecessary platelet transfusion.

Platelet clumping may be caused by various underlying mechanisms. For example, ethylenediaminetetraacetic acid-dependent PTCP (EDTA-PTCP) is commonly observed in laboratories with estimated prevalence of 0.10% to 2% in hospitalized patients. It is due to in vitro agglutination of platelets in the blood collection tube caused by autoantibodies directed against epitopes on platelet surface glycoprotein (GP) IIb/IIIa. EDTA induces a conformational change in GP IIb/IIIa, exposing these epitopes and resulting in platelet clumping. It has been suggested that collecting a blood sample in an alternative anticoagulant, such as citrate or heparin may be helpful in preventing EDTA-PTCP. However, up to 17% of patients with EDTA-PTCP also show this phenomenon when the blood sample is collected in citrate.

Other possible factors that may contribute to platelet clumping have been reported, including improper blood collection methods, such as capillary collections, delay in blood drawing, and exposure of blood sample to cold temperatures. Reversal of platelet aggregation by supplementation with amikacin in vitro. Viral infection or use of drugs and medications are also possible inducers of platelet clumping.

Recent studies have focused on the prevention of platelet clump formation, or the dissolution of platelet clumps in vivo to avoid thromboembolic episodes. There is a need for methods and compositions useful for reversing or dissolution of platelet clumps formed in collected blood samples. The inventions provided herein meet these needs.

SUMMARY

Provided herein are methods, compositions and kits for reversing platelet clumping in a blood sample. In certain embodiments, provided herein are methods for dissolution of platelet clumps in a blood sample. In some embodiments, the method comprising contacting the blood sample with a chelator capable of reducing reactive $Ca^{2+}$ from the blood sample. In some embodiments, the blood sample is collected by drawing blood into a heparin containing container.

In some aspects, the heparin is lithium heparin (LiHep). In some aspects, the chelator includes ethylenediaminetetraacetic acid (EDTA) or a salt thereof. In some aspects, the chelator includes citric acid or a salt thereof. In some aspects, the contacting step is performed by contacting the chelator with the blood sample containing platelet clumps.

In some aspects, the chelator includes EDTA or a salt thereof and the contacting step is performed by contacting EDTA or a salt thereof with the blood sample to a final EDTA concentration of no more than about 20 mM. In some aspects, the contacting step is performed by contacting EDTA or a salt thereof with the blood sample to a final EDTA concentration of in the range of about 4 mM to about 20 mM EDTA.

In some aspects, the chelator includes citric acid or a salt thereof, and wherein the contacting step is performed by contacting an acid citrate dextrose (ACD) solution with the blood sample to a final ACD concentration in the range of about 5% to about 20% by volume. In some aspects, after the contacting step the method further includes applying a physical force to the blood sample. In some aspects, the physical force is selected from vortexing, pipetting, sonication, acoustic mixing, mechanical vibrating (e.g., shaking, inverting, stirring), and other suitable forms of physical forces known in the art.

In some aspects, the chelator includes EDTA or a salt of EDTA, and citric acid or a salt of citric acid, and wherein the contacting step is performed by contacting EDTA with the blood sample to a final EDTA concentration of about 18 mM and contacting the ACD solution with the blood sample to a final ACD concentration of about 9.7% by volume. In some aspects, the chelator includes EDTA or a salt of EDTA, and citric acid or a salt of citric acid, and wherein the contacting step is performed by contacting EDTA or the salt of EDTA with the blood sample to a final EDTA concentration of about 16.5 mM and contacting the ACD solution with the blood sample to a final ACD concentration of about 17.6% by volume. In some aspects, the method improves accuracy of an assay. In some aspects, the assay is a complete blood count (CBC) assay, a red blood cell (RBC) count assay, a white blood cell (WBC) count assay, a white blood cell (WBC) differential assay, a platelet count assay or a mean platelet volume (MPV) assay. In some aspects, the method prevents a misdiagnosis of a condition. In some aspects, the misdiagnosis is pseudothrombocytopenia or pseudoleukocytosis.

In embodiments, provided herein are methods for collecting a blood sample. In some embodiments, the method includes drawing blood into a heparin containing container to form the blood sample, and contacting the blood sample with a chelator capable of reducing reactive $Ca^{2+}$ from the blood sample, thereby reversing or preventing platelet clumping and increasing platelet count.

In some aspects, the chelator includes ethylenediaminetetraacetic acid (EDTA) or a salt thereof. In some aspects, the contacting step is performed by contacting EDTA or a salt thereof with the blood sample to a reach a final EDTA concentration of no more than 20 mM. In some aspects, the contacting step is performed by contacting EDTA or a salt thereof with the blood sample to a final to reach a final EDTA concentration in the range of about 4 mM to about 20 mM. In some aspects, the final EDTA concentration is about 18 mM or about 16.5 mM.

In some aspects, the chelator includes an acid citrate dextrose (ACD) solution. In some aspects, the contacting step is performed by contacting ACD with the blood sample to reach a final ACD concentration in the range of about 5% to about 20% by volume. In some aspects, the final ACD concentration is about 9.7% or about 17.6% by volume.

In some embodiments, the method further includes applying a physical force to the blood sample before subjecting the blood sample to an assay. In some aspects, the physical force is selected from vortexing, pipetting, sonication, acoustic mixing, mechanical vibrating (e.g., shaking, inverting, stirring), and other suitable forms of physical forces known in the art. In some aspects, the heparin-containing tube is a LiHep containing tube.

In one embodiment, provided herein are methods for performing a blood assay. In some aspects, the method includes the steps of providing a blood sample collected from a subject by drawing blood into a heparin-containing container; obtaining two or more aliquots from the blood sample; contacting a first aliquot of the blood sample with ethylenediaminetetraacetic acid (EDTA) or a salt thereof and an acid citrate dextrose (ACD) solution; and subjecting the first aliquot to a first assay selected from one or more immunoassays, platelet activation assays and blood count assays.

In some embodiments, before subjecting the first aliquot to the first assay, the method further includes applying a physical force to the blood sample. In some aspects, the physical force is vortexing, pipetting, sonication, acoustic mixing, and/or mechanical vibrating. In some aspects, the blood count assays includes a complete blood count (CBC) assay, a red blood cell (RBC) count assay, a white blood cell (WBC) count assay, a white blood cell (WBC) differential assay, a platelet count assay or a mean platelet volume (MPV) assay. In some aspects, the method further includes subjecting a second aliquot of the blood sample to a second assay selected from one or more immunoassays and clinical chemistry assays.

In one embodiment, provided herein are methods for detecting platelet clumping in a blood sample. In some aspects, the method includes: (a) measuring a first platelet count in the blood sample; (b) contacting the blood sample with a chelator capable of reducing reactive $Ca^{2+}$ from the blood sample; (c) measuring a second platelet count in the blood sample; (d) optionally comparing the first platelet count to the second platelet count; and (e) detecting platelet clumping if the second platelet count is substantially increased compared to the first platelet count. In one embodiment, provided herein are methods for evaluating a quality of a blood sample comprising (a) measuring a first platelet count in the blood sample; (b) contacting the blood sample with a chelator capable of reducing reactive $Ca^{2+}$ from the blood sample; (c) measuring a second platelet count in the blood sample; (d) optionally comparing the first platelet count to the second platelet count; and (e) classifying the blood sample as having a poor quality if the second platelet count is substantially increased compared to the first platelet count.

In some aspects, the chelator includes ethylenediaminetetraacetic acid (EDTA) or a salt thereof. In some aspects, the contacting step is performed by contacting EDTA or a salt thereof with the blood sample to a final EDTA concentration of less than 20 mM. In some aspects, the contacting step is performed by contacting EDTA or a salt thereof with the blood sample to a final EDTA concentration in the range of about 4 mM to 20 mM. In some aspects, the final EDTA concentration is about 18 mM or about 16.5 mM. In some aspects, the chelator further includes citric acid or a salt thereof In some embodiments, the contacting step is performed by contacting an acid citrate dextrose (ACD) solution with the blood sample to a final ACD concentration in the range of about 5% to about 20% by volume. In some aspects, the final ACD concentration is about 9.7% or about 17.6% by volume.

In some aspects, the chelator includes EDTA or a salt of EDTA, and citric acid or a salt of citric acid, and the contacting step is performed by contacting EDTA or the salt of EDTA with the blood sample to a final EDTA concentration of about 18 mM and contacting an ACD solution with the blood sample to a final ACD concentration of 9.7% by volume. In some aspects, the chelator includes EDTA or a salt of EDTA, and citric acid or a salt of citric acid, and the contacting step is performed by contacting EDTA or a salt thereof with the blood sample to a final EDTA concentration of about 16.5 mM and contacting an ACD solution with the blood sample to a final ACD concentration of 17.6% by volume.

In some embodiments, the method further includes collecting a new blood sample from the subject if the second platelet count is substantially increased compared to the first platelet count.

In embodiments, provided herein is a kit. In some aspects, the kit includes a container for collecting a blood sample and a first composition comprising ethylenediaminetetraacetic acid (EDTA) or a salt thereof, wherein the EDTA or the salt thereof is not in the container for collecting the blood sample. In some aspects, the kit further includes a second composition comprising an acid citrate dextrose (ACD) solution. In some aspects, the kit further includes a third composition comprising heparin. In some aspects the heparin is LiHep. In some aspects the third composition and the first composition are enclosed in separate containers. In some aspects the third composition and the second composition are enclosed in separate containers. In some aspects the third composition is enclosed in the container for collecting the blood sample.

DETAILED DESCRIPTION

Figure 1:
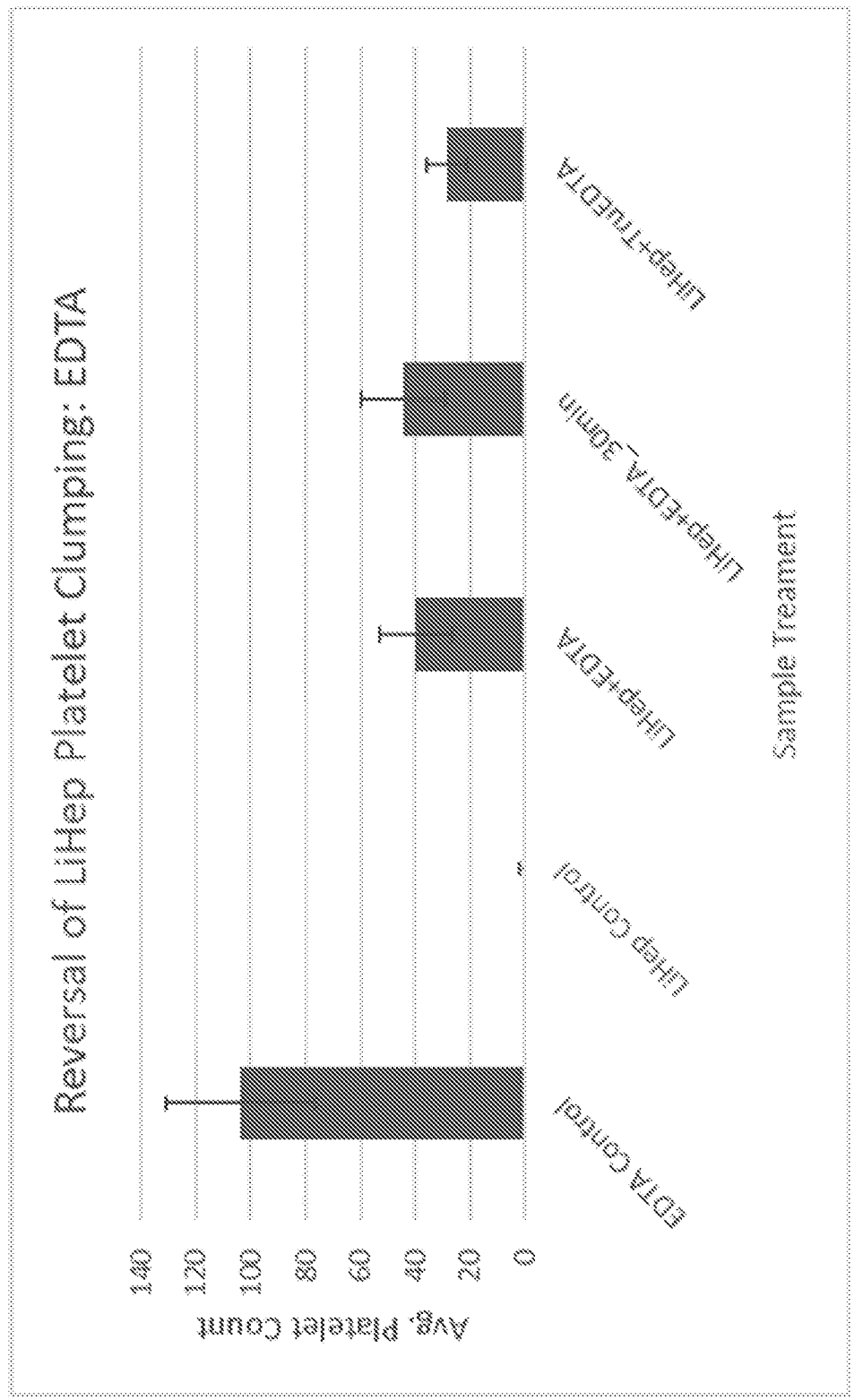
FIG. 1 shows that EDTA partially reverses platelet clumping. X axis indicates sample type; Y axis shows average platelet counts in blood samples per unit field of view. Sample stained with Azure B.

Provided herein are methods and related compositions and kits for reversing platelet clumping in a blood sample.

General Techniques

Techniques and procedures described or referenced herein include those that are generally well understood and/or commonly employed using conventional methodology by those skilled in the art, such as, for example, the widely utilized methodologies described in Kandice Kottke-Marchant and Bruce H Davis "Laboratory Hematology Practice" (1$^{st}$ ed. 2012); and Barbara J. Bain "Blood Cells A Practical Guide" (4$^{th}$ ed. 2006).

Terminology

Unless described otherwise, all technical and scientific terms used herein have the same meaning as is commonly understood by one of ordinary skill in the art. For purposes of interpreting this specification, the following description of terms will apply and whenever appropriate, terms used in the singular will also include the plural and vice versa. All patents, applications, published applications, and other publications are incorporated by reference in their entirety. In the event that any description of terms set forth conflicts with any document incorporated herein by reference, the description of term set forth below shall control.

As used herein, the singular terms "a," "an," and "the" include the plural reference unless the context clearly indicates otherwise.

The term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

As used herein, the term "contacting" and its grammatical variations, when used in reference to two or more components, refers to any process whereby the approach, proximity, mixture or commingling of the referenced components is promoted or achieved without necessarily requiring physical contact of such components, and includes mixing of solutions containing any one or more of the referenced components with each other. The referenced components may be contacted in any particular order or combination and the particular order of recitation of components is not limiting. For example, "contacting A with B and C" encompasses embodiments where A is first contacted with B then C, as well as embodiments where C is contacted with A then B, as well as embodiments where a mixture of A and C is contacted with B, and the like. Furthermore, such contacting does not necessarily require that the end result of the contacting process be a mixture including all of the referenced components, as long as at some point during the contacting process all of the referenced components are simultaneously present or simultaneously included in the same mixture or solution. Where one or more of the referenced components to be contacted includes a plurality, then each member of the plurality can be viewed as an individual component of the contacting process, such that the contacting can include contacting of any one or more members of the plurality with any other member of the plurality and/or with any other referenced component in any order or combination.

The term "platelet" is a term of art, and refers to small anucleate cellular fragments that are generated from the nucleated precursor cells known as megakaryocytes in the bone marrow and enter the bloodstream without nuclei. Mature megakaryocytes restructure their cytoplasm and extend pseudopodial projections referred to as proplatelets, through cells of the sinusoidal endothelial layer and shed platelets into the circulation. A steady supply is secured by a continuous production and clearance of platelets daily to maintain 150-400×10$^9$ of blood level. Platelets are metabolically active cells and containing numerous functional organelles such as endoplasmic reticulum, Golgi apparatus, and mitochondria. They have a wide array of surface receptors and adhesion molecules and contain numerous granules. Since they have mRNA, platelets can synthesize a limited amount of proteins. However, there are a vast number of molecules preformed and inherited from the megakaryocytes in platelets, which can be released upon activation. Platelets play key roles in hemostasis. Platelets can rapidly bind to damaged blood vessels, aggregate to form thrombi, and prevent excessive bleeding.

The term "platelet activation" is a term of art, and refers to the process or pathway leading to activation of one or more resting receptors on the platelet surface, which then plays a central role in initiating platelet aggregation and/or coagulation cascades. Platelet activation and coagulation normally do not occur in an intact blood vessel. Platelet activation can be induced by various distinct mechanisms. For example, in the situation of blood vessel wall injury, the high shear conditions in the blood causes von Willebrand factor (vWF) to form a bridge between collagen and the platelet GP receptor complex. Platelets are first slowed down from their bold flow velocity by interacting with the collagen-bound vWF and are subsequently stopped by binding directly to the collagen by their GP receptor complex. In other examples, prothrombotic factors secreted by local tissues or released from activated platelets can induce or further aggravate platelet activation. Multiple pathways can lead to platelet activations. Further, activated platelets may change shape and release contents of their granules, triggering the cascades that lead to blood coagulation.

The terms "platelet clumping" and "platelet aggregation" are used interchangeably herein to refer to the phenomenon of in vitro agglutination of platelets in a collected blood sample, and the aggregation of platelets thus formed is referred to as a "platelet clump." There can be distinct mechanisms underlying the phenomenon of platelet clumping. For example, in laboratory practice, platelet clumping can occur in blood samples collected into a blood collection tube containing an anticoagulation agent, such as ethylenediaminetetraacetic acid (EDTA), sodium citrate, or heparin. Other possible factors that may contribute to platelet clumping include but are not limited faulty phlebotomy techniques, such as using too tight tourniquet, delay in blood drawing, exposing blood sample to cold temperature, and the like, and pathological conditions of a subject, such as viral infection or treatment with certain medication or drugs. Particularly, without being bound by theory, it is contemplated that activated GP IIb/IIIa receptor complex on the platelet surface may play a central role in mediating in vitro platelet aggregation. For example, in some embodiments of the present disclosure, the activation of GP IIb/IIIa receptors result in the cross-linking of fibrinogen or vWF between receptors, leading to the phenomenon of platelet aggregation.

It is to be noted that platelet clumping or platelet aggregation in the context of the present disclosure can occur with or without platelet activation. Platelet clumping is also to be distinguished from blood coagulation. For example, in some embodiments of the present disclosure, an improper blood collection method may induce conformational change in one or more GP receptors on the platelet surface, leading to platelet clumping without activating the platelets or causing blood coagulation in the collected blood sample. According to the present disclosure, platelet clumping can occur in a blood sample without affecting appearance of the sample to the naked human eye. As such, without proper examination, a medical practitioner or lab personnel may subject the blood sample to a blood assay without recognizing that the sample contains platelet clumps, thus causing artefacts in the blood assay and/or misdiagnosis of a condition of the blood donor. Methods for detecting platelet clumps are known in the art, such as visualizing platelets and examining the morphology under a microscope (e.g., standard blood smear examination), and those described in the Example section. Further, according to the present disclosure, platelet clumps can be reversed using the methods or compositions described herein, releasing intact and normal platelets from the dissolved platelet clumps. As used herein "dissolution of platelet clumps" or "reversing platelet clumping" refers to the in vitro process that releases individual platelets from platelet clumps, with which the process diminishes or completely dissolves platelet clumps in a blood sample. Formation and dissolution of platelet clumps can be detected in various ways, including visual inspection of a blood sample under a microscope or using a hematology analyzer.

As used herein, "chelator" or "chelating agent" means an active agent capable of removing a metal ion from a system by forming a complex so that the metal ion cannot readily participate in or catalyze chemical reactions. The inclusion of a chelating agent in the present method, composition, or kit is especially useful for removing reactive metal ions that facilitate formation of a pro-coagulation surface on platelets, such as $Ca^{2+}$. Particularly, the chelator can be any chemicals that binds a metal but does not affect a target analyte in a blood sample. For example, the chelator can be an organic chelating ligand such as those known in the art using amine, oxygen and/or carboxylate functionalities on the organic chelating ligand. By way of example, such an organic chelating ligand preferably coordinates a metal using the coordination chemistry of a compound such as, but not limited to, diethylenetriaminepentaacetic acid (DTPA), 1,4,7,10-tetraazacyclododecane-1,4,7,10-tetraacetic acid (DOTA), 1,2-bis(o-aminophenoxy)ethane-N,N,N,$N^9$-tetraacetic acid (BAPTA), ethylenediaminetetraacetic acid (EDTA), ethyleneglycol-bis(3-aminoethyl)-N,N,V,N11-tetraacetic acid (EGTA), N,N-bis(carboxymethyl)glycine (NTA), mercaptoacetylglycine (MAG3), 1,4,8,11-tetraazacyclotetradecane (CYCLAM), 1,4,7,10-tetraazacyclododecane, cyclen, 1,4,7-triazacyclononane (TACN), hydrazinonicotinamide (HYNIC), 2-hydroxypropane-1,2,3-tricarboxylic acid (citric acid), or any combination thereof.

"Acid citrate dextrose (ACD)" as used herein refers to a solution of citric acid, sodium citrate, and dextrose in water that can be used as anticoagulant to preserve blood samples. Two formulae (Solutions A and B) have been defined and having the following properties:

| Solution A (per 1000 mL) | |
| --- | --- |
| Total Citrate (as citric acid, anhydrous ($C_6H_8O_7$)) | 20.59 to 22.75 g |
| Dextrose ($C_6H_{12}O_6*H_2O$) | 23.28 g to 25.73 g |
| Sodium (Na) | 4.90 g to 5.42 g |

| Solution B (per 1000 mL) | |
| --- | --- |
| Total Citrate (as citric acid, anhydrous ($C_6H_8O_7$)) | 12.37 to 13.67 g |
| Dextrose ($C_6H_{12}O_6*H_2O$) | 13.96 to 15.44 g |
| Sodium (Na) | 2.94 to 3.25 g |

ACD solutions can be made using methods known in the art, For example, to make solution A, dissolve 7.3 g citric acid, anhydrous ($C_6H_8O_7$), 22.0 g sodium citrate, dihydrate and 24.5 g dextrose, monohydrate ($C_6H_{12}O_6$) in water for injection and adjust final volume to 1000 ml. To make solution B, dissolve 4.4 g citric acid, anhydrous ($C_6H_8O_7$), 13.2 g sodium citrate, dihydrate and 14.7 g dextrose, monohydrate ($C_6H_{12}O_6$) in water for injection and adjust final volume to 1000 ml. In one embodiment, Solution A composed of 22.0 g/L citric acid, trisodium salt, dihydrate; 7.3 g/L citric acid, anhydrous; and 24.5 g/L D-(+)-Glucose is used.

The phrase "substantially similar" or "substantially the same" denotes a sufficiently high degree of similarity between two numeric values (e.g., one associated with untreated (reference) blood sample and the other associated with a sample treated with the method and compositions described herein) such that one of skill in the art would consider the difference between the two values to be of little or no biological and/or statistical significance within the context of the biological characteristic measured by the values (e.g., platelet count or white blood cell count). For example, the difference between the two values may be less than about 50%, less than about 40%, less than about 30%, less than about 20%, less than about 10%, or less than about 5%, as a function of the value for the reference sample.

The phrase "substantially increased," "substantially reduced," or "substantially different," as used herein, denotes a sufficiently high degree of difference between two numeric values (e.g., one associated with untreated (reference) blood sample and the other associated with a sample treated with the method and compositions described herein) such that one of skill in the art would consider the difference between the two values to be of statistical significance within the context of the biological characteristic measured by the values. For example, the difference between said two values can be greater than about 10%, greater than about 20%, greater than about 30%, greater than about 40%, or greater than about 50%, as a function of the value for the reference sample.

By "assaying" or its grammatical variant is meant the creation of experimental conditions and the gathering of data regarding a particular result of the exposure to specific experimental conditions. For example, a blood sample may be subjected to an assay for blood indexes such as enzymatic levels, number of blood cells, number of platelets, and the like.

The term "container" as used herein broadly refers to any receptacle of a desirable form and constructed of a suitable material for receiving, holding, enclosing and/or passing along a content, such as biological materials and/or chemical reagents. Suitable forms of a container that can be used in connection with the present disclosure include but are not limited to a tube (e.g., blood collection tubes), a plate (e.g., 96-hole plates), a dish (e.g., petri dishes), and a fluidic passage (e.g., capillary pipes or other microfluidic cartridges or devices). A container can be fabricated from glass, plastic, ceramic, metal, or other materials typically employed to hold biological materials or chemical reagents, provided that the portion of the container designed to be in contact with its intended content is fabricated from a material that does not react with the content.

The terms "subject," "individual" and "patient" may be used interchangeably. As used herein, in certain embodiments, a subject is a mammal, such as a non-primate (e.g., cow, pig, horse, cat, dog, rat and the like) or a primate (e.g., monkey and human). In specific embodiments, the subject is a human. In specific embodiments, the subject is a blood donor from which a blood sample is taken.

Methods

In embodiments, provided herein are methods for reversing platelet clumping in vitro in a blood sample. In various embodiments, the present method can be used for evaluating and/or improving suitability of a blood sample for a blood assay, or for reducing likelihood of misdiagnosis of a condition in a subject based on a blood assay.

The blood sample can be collected using conventional methods (e.g., standard phlebotomy practices of venipuncture or fingerstick) and/or using conventional devices (e.g., conventional blood collection tubes) that are well known to persons of ordinary skill in the art. In some embodiments, a blood sample is collected from a subject for the purpose of examining a blood condition of the subject. For example, blood samples that can be used in connection with the present disclosure include those collected in a lab of a hospital or clinics for examining a patient's health condition, diagnosing a disease, or monitoring progression of a condition in the patient.

In some embodiments, the blood samples are collected for the purpose of conducting a blood test or subjecting to a blood assay. Some blood tests or assays require the use of serum, some require plasma, and others require whole blood. According to the present disclosure, the methods of the present disclosure are particularly useful for blood tests or assays that utilize whole blood or plasma (e.g., platelet rich plasma), including but not limited to various immunoassays, platelet activation assays, and blood count assays, such as a complete blood count (CBC) assay, a red blood cell (RBC) count assay, a white blood cell (WBC) count assay, a white blood cell (WBC) differential assay, a platelet count assay or a mean platelet volume (MPV) assay.

In some embodiments, the blood sample is collected into a container containing an anticoagulant purported to prevent the blood from coagulation after the blood sample is collected. Various anticoagulants that can be used in a blood collection tube are known in the art, and examples of such anticoagulants include but are not limited to sodium citrate, sodium heparin, lithium heparin, EDTA, sodium oxalate, potassium oxalate, acid citrate dextrose (ACD), Citrate-Theophylline-Adenosine-Dipyridamol (CTAD), and any combination thereof.

It is observed that certain anticoagulants, while being able to prevent blood coagulation, can induce platelet clumping in a blood sample. Platelet clumping in a testing sample can go unrecognized, because a blood sample containing platelet clumps may appear normal to naked human eyes. Recent advances in automated blood cell counting and sizing have made a complete blood count (CBC) assay, a red blood cell (RBC) count assay, a white blood cell (WBC) count assay, a white blood cell (WBC) differential assay, a platelet count assay or a mean platelet volume (MPV) assay routinely available in most clinical laboratories. However, it has also been reported that certain automated electronic blood counters are incapable of detecting platelet clumping. Because of their size, platelet clumps cannot be measured in the platelet population, and may also interfere with red and white blood cell counts, or be included in the cluster of non-white cells as measured by an automated blood counter. Thus, unrecognized platelet clumping in a testing blood sample may lead to a spurious low platelet count known as pseudothrombocytopenia, or a spurious high white blood cell count known as pseudoleukocytosis, and may further lead to misdiagnosis of conditions that are known to cause thrombocytopenia or leukocytosis, such as aplastic anemia, vitamin B-12 deficiency, folate deficiency, iron deficiency, viral infections or cirrhosis.

Without being bound by theory, it is contemplated that anticoagulant-induced platelet clumping in an in vitro blood sample can be reversed by reducing the amount of reactive metal ions that facilitate formation of a pro-coagulation surface on platelets. In some embodiments, the metal ion is $Ca^{2+}$. Accordingly, in some embodiments, provided herein are methods for dissolution of platelet clumps in a blood sample comprising contacting the blood sample with a chelator capable of reducing reactive $Ca^{2+}$ from the blood sample.

In some embodiments, the blood sample is collected from a blood donor subject into a collection tube containing an anticoagulant. In some embodiments, the anticoagulant is heparin. In some embodiments, the anticoagulant is lithium heparin. In some embodiments, the anticoagulant is sodium heparin. In some embodiments, the anticoagulant is ACD. In some embodiments, the anticoagulant is not ACD. In some embodiments, the anticoagulant is EDTA. In some embodiments, the anticoagulant is not EDTA. In some embodiments, the anticoagulant is sodium citrate. In some embodiments, the anticoagulant is not sodium citrate. In some embodiments, the anticoagulant is sodium oxalate. In some embodiments, the anticoagulant is not sodium oxalate. In some embodiments, the anticoagulant is potassium oxalate. In some embodiments, the anticoagulant is not potassium oxalate. In some embodiments, the anticoagulant is CTAD. In some embodiments, the anticoagulant is not CTAD.

In some embodiments, the present methods are capable of dissolution of platelet clumps that are formed in vitro. In some embodiments, the platelet clumps are formed after the blood sample is collected from a subject into a container. In some embodiments, the container contains one or more anticoagulants and the platelet clumps are formed after the blood sample is contacted with the one or more anticoagulants. In an embodiment, the blood sample is collected by drawing blood into a heparin-containing container, and the platelet clumps are formed after the blood is contacted with heparin in the container. In specific embodiments, the heparin in the blood collection container is lithium heparin. In specific embodiments, the heparin in the blood collection container is sodium heparin. In the various embodiments described herein, the method for dissolution of platelet clumps in the blood sample includes contacting the blood sample with a chelator capable of reducing reactive $Ca^{2+}$ from the blood sample.

In some embodiments, the chelator includes diethylenetriaminepentaacetic acid (DTPA), 1,4,7,10-tetraazacyclododecane-1,4,7,10-tetraacetic acid (DOTA), 1,2-bis(o-aminophenoxy)ethane-N,N,N',N'-tetraacetic acid (BAPTA), ethylenediamine tetraacetic acid (EDTA), ethyleneglycol-bis((3-aminoethyl)-N,N,Nr,Nr-tetraacetic acid (EGTA), N,N-bis(carboxymethyl)glycine (NTA), mercaptoacetylglycine (MAG3), 1,4,8,11-tetraazacyclotetradecane (CYCLAM), 1,4,7,10-tetraazacyclododecane, cyclen, 1,4,7-triazacyclononane (TACN), hydrazinonicotinamide (HYNIC), 2-hydroxypropane-1,2,3-tricarboxylic acid (citric acid), a salt form of anyone of the foregoing, or any combination of the foregoing. In some embodiments, the chelator includes citric acid or a salt thereof. In some embodiments, the citric acid or salt form therefor is provided in an ACD solution described herein.

In some embodiments, a chelator as described herein is dissolved into a solution. The solution is applied and then dried on a solid surface. In some embodiments, contacting the chelator with a blood sample can be performed by contacting the blood with the chelator dry coat on the solid surface, thereby dissolving the chelator into the blood. In some embodiments, the chelator is dissolved into a buffer solution, such as the phosphate buffer saline (PBS). Depending on the type of chelator, those of ordinary skill in the art knows how to select a suitable buffer solution to be used. For example, in some embodiments, EDTA can be dissolved into PBS, and air-dried in a tube or well.

In some embodiments, a chelator as described herein is provided in a composition comprising the chelator. For example, in some embodiments, the chelator includes citric acid or a salt thereof. In some embodiments, the citric acid or salt thereof is provided in an ACD solution described herein.

In embodiments, the present method includes contacting chelator with a blood sample to a final chelator concentration of no more than 60 mM, wherein the blood sample contains platelet clumps. In some embodiments, the present method includes contacting chelator with a blood sample to a final chelator concentration in the range of about 4 mM to about 20 mM, wherein the blood sample contains platelet clumps. In some embodiments, the method includes contacting chelator with a blood sample to a final chelator concentration of about 4 mM, wherein the blood sample contains platelet clumps. In some embodiments, the method includes contacting chelator with a blood sample to a final chelator concentration of about 4.5 mM, wherein the blood sample contains platelet clumps. In some embodiments, the method includes contacting chelator with a blood sample to a final chelator concentration of about 5 mM, wherein the blood sample contains platelet clumps. In some embodiments, the method includes contacting chelator with a blood sample to a final chelator concentration of about 5.5 mM, wherein the blood sample contains platelet clumps. In some embodiments, the method includes contacting chelator with a blood sample to a final chelator concentration of about 6 mM, wherein the blood sample contains platelet clumps. In some embodiments, the method includes contacting chelator with a blood sample to a final chelator concentration of about 6.5 mM, wherein the blood sample contains platelet clumps. In some embodiments, the method includes contacting chelator with a blood sample to a final chelator concentration of about 7 mM, wherein the blood sample contains platelet clumps. In some embodiments, the method includes contacting chelator with a blood sample to a final chelator concentration of about 7.5 mM, wherein the blood sample contains platelet clumps. In some embodiments, the method includes contacting chelator with a blood sample to a final chelator concentration of about 8 mM, wherein the blood sample contains platelet clumps. In some embodiments, the method includes contacting chelator with a blood sample to a final chelator concentration of about 8.5 mM, wherein the blood sample contains platelet clumps. In some embodiments, the method includes contacting chelator with a blood sample to a final chelator concentration of about 9 mM, wherein the blood sample contains platelet clumps. In some embodiments, the method includes contacting chelator with a blood sample to a final chelator concentration of about 9.5 mM, wherein the blood sample contains platelet clumps. In some embodiments, the method includes contacting chelator with a blood sample to a final chelator concentration of about 10 mM, wherein the blood sample contains platelet clumps. In some embodiments, the method includes contacting chelator with a blood sample to a final chelator concentration of about 10.5 mM, wherein the blood sample contains platelet clumps. In some embodiments, the method includes contacting chelator with a blood sample to a final chelator concentration of about 11 mM, wherein the blood sample contains platelet clumps. In some embodiments, the method includes contacting chelator with a blood sample to a final chelator concentration of about 11.5 mM, wherein the blood sample contains platelet clumps. In some embodiments, the method includes contacting chelator with a blood sample to a final chelator concentration of about 12 mM, wherein the blood sample contains platelet clumps. In some embodiments, the method includes contacting chelator with a blood sample to a final chelator concentration of about 12.5 mM, wherein the blood sample contains platelet clumps. In some embodiments, the method includes contacting chelator with a blood sample to a final chelator concentration of about 13 mM, wherein the blood sample contains platelet clumps. In some embodiments, the method includes contacting chelator with a blood sample to a final chelator concentration of about 13.5 mM, wherein the blood sample contains platelet clumps. In some embodiments, the method includes contacting chelator with a blood sample to a final chelator concentration of about 14 mM, wherein the blood sample contains platelet clumps. In some embodiments, the method includes contacting chelator with a blood sample to a final chelator concentration of about 14.5 mM, wherein the blood sample contains platelet clumps. In some embodiments, the method includes contacting chelator with a blood sample to a final chelator concentration of about 15 mM, wherein the blood sample contains platelet clumps. In some embodiments, the method includes contacting chelator with a blood sample to a final chelator concentration of about 15.5 mM, wherein the blood sample contains platelet clumps. In some embodiments, the method includes contacting chelator with a blood sample to a final chelator concentration of about 16 mM, wherein the blood sample contains platelet clumps. In some embodiments, the method includes contacting chelator with a blood sample to a final chelator concentration of about 16.5 mM, wherein the blood sample contains platelet clumps. In some embodiments, the method includes contacting chelator with a blood sample to a final chelator concentration of about 17 mM, wherein the blood sample contains platelet clumps. In some embodiments, the method includes contacting chelator with a blood sample to a final chelator concentration of about 17.5 mM, wherein the blood sample contains platelet clumps. In some embodiments, the method includes contacting chelator with a blood sample to a final chelator concentration of about 18 mM, wherein the blood sample contains platelet clumps. In some embodiments, the method includes contacting chelator with a blood sample to a final chelator concentration of about 18.5 mM, wherein the blood sample contains platelet clumps. In some embodiments, the method includes contacting chelator with a blood sample to a final chelator concentration of about 19 mM, wherein the blood sample contains platelet clumps. In some embodiments, the method includes contacting chelator with a blood sample to a final chelator concentration of about 19.5 mM, wherein the blood sample contains platelet clumps. In some embodiments, the method includes contacting chelator with a blood sample to a final chelator concentration of about 20 mM, wherein the blood sample contains platelet clumps. In some embodiments, the method includes contacting chelator with a blood sample to a final chelator concentration of about 21 mM, wherein the blood sample contains platelet clumps. In some embodiments, the method includes contacting chelator with a blood sample to a final chelator concentration of about 22 mM, wherein the blood sample contains platelet clumps. In some embodiments, the method includes contacting chelator with a blood sample to a final chelator concentration of about 23 mM, wherein the blood sample contains platelet clumps. In some embodiments, the method includes contacting chelator with a blood sample to a final chelator concentration of about 24 mM, wherein the blood sample contains platelet clumps. In some embodiments, the method includes contacting chelator with a blood sample to a final chelator concentration of about 25 mM, wherein the blood sample contains platelet clumps. In some embodiments, the method includes contacting chelator with a blood sample to a final chelator concentration of about 26 mM, wherein the blood sample contains platelet clumps. In some embodiments, the method includes contacting chelator with a blood sample to a final chelator concentration of about 27 mM, wherein the blood sample contains platelet clumps. In some embodiments, the method includes contacting chelator with a blood sample to a final chelator concentration of about 28 mM, wherein the blood sample contains platelet clumps. In some embodiments, the method includes contacting chelator with a blood sample to a final chelator concentration of about 29 mM, wherein the blood sample contains platelet clumps. In some embodiments, the method includes contacting chelator with a blood sample to a final chelator concentration of about 30 mM, wherein the blood sample contains platelet clumps. In some embodiments, the method includes contacting chelator with a blood sample to a final chelator concentration of about 31 mM, wherein the blood sample contains platelet clumps. In some embodiments, the method includes contacting chelator with a blood sample to a final chelator concentration of about 32 mM, wherein the blood sample contains platelet clumps. In some embodiments, the method includes contacting chelator with a blood sample to a final chelator concentration of about 33 mM, wherein the blood sample contains platelet clumps. In some embodiments, the method includes contacting chelator with a blood sample to a final chelator concentration of about 34 mM, wherein the blood sample contains platelet clumps. In some embodiments, the method includes contacting chelator with a blood sample to a final chelator concentration of about 35 mM, wherein the blood sample contains platelet clumps. In some embodiments, the method includes contacting chelator with a blood sample to a final chelator concentration of about 36 mM, wherein the blood sample contains platelet clumps. In some embodiments, the method includes contacting chelator with a blood sample to a final chelator concentration of about 37 mM, wherein the blood sample contains platelet clumps. In some embodiments, the method includes contacting chelator with a blood sample to a final chelator concentration of about 38 mM, wherein the blood sample contains platelet clumps. In some embodiments, the method includes contacting chelator with a blood sample to a final chelator concentration of about 39 mM, wherein the blood sample contains platelet clumps. In some embodiments, the method includes contacting chelator with a blood sample to a final chelator concentration of about 40 mM, wherein the blood sample contains platelet clumps. In some embodiments, the method includes contacting chelator with a blood sample to a final chelator concentration of about 41 mM, wherein the blood sample contains platelet clumps. In some embodiments, the method includes contacting chelator with a blood sample to a final chelator concentration of about 42 mM, wherein the blood sample contains platelet clumps. In some embodiments, the method includes contacting chelator with a blood sample to a final chelator concentration of about 43 mM, wherein the blood sample contains platelet clumps. In some embodiments, the method includes contacting chelator with a blood sample to a final chelator concentration of about 44 mM, wherein the blood sample contains platelet clumps. In some embodiments, the method includes contacting chelator with a blood sample to a final chelator concentration of about 45 mM, wherein the blood sample contains platelet clumps. In some embodiments, the method includes contacting chelator with a blood sample to a final chelator concentration of about 46 mM, wherein the blood sample contains platelet clumps. In some embodiments, the method includes contacting chelator with a blood sample to a final chelator concentration of about 47 mM, wherein the blood sample contains platelet clumps. In some embodiments, the method includes contacting chelator with a blood sample to a final chelator concentration of about 48 mM, wherein the blood sample contains platelet clumps. In some embodiments, the method includes contacting chelator with a blood sample to a final chelator concentration of about 49 mM, wherein the blood sample contains platelet clumps. In some embodiments, the method includes contacting chelator with a blood sample to a final chelator concentration of about 50 mM, wherein the blood sample contains platelet clumps. In some embodiments, the method includes contacting chelator with a blood sample to a final chelator concentration of about 51 mM, wherein the blood sample contains platelet clumps. In some embodiments, the method includes contacting chelator with a blood sample to a final chelator concentration of about 52 mM, wherein the blood sample contains platelet clumps. In some embodiments, the method includes contacting chelator with a blood sample to a final chelator concentration of about 53 mM, wherein the blood sample contains platelet clumps. In some embodiments, the method includes contacting chelator with a blood sample to a final chelator concentration of about 54 mM, wherein the blood sample contains platelet clumps. In some embodiments, the method includes contacting chelator with a blood sample to a final chelator concentration of about 55 mM, wherein the blood sample contains platelet clumps. In some embodiments, the method includes contacting chelator with a blood sample to a final chelator concentration of about 56 mM, wherein the blood sample contains platelet clumps. In some embodiments, the method includes contacting chelator with a blood sample to a final chelator concentration of about 57 mM, wherein the blood sample contains platelet clumps. In some embodiments, the method includes contacting chelator with a blood sample to a final chelator concentration of about 58 mM, wherein the blood sample contains platelet clumps. In some embodiments, the method includes contacting chelator with a blood sample to a final chelator concentration of about 59 mM, wherein the blood sample contains platelet clumps. In some embodiments, the method includes contacting chelator with a blood sample to a final chelator concentration of about 60 mM, wherein the blood sample contains platelet clumps. In some embodiments described herein, the platelet clumps are formed in vitro. In some embodiments described herein, the platelet clumps are formed after the blood sample is collected into a container. In some embodiments as described herein, the platelet clumps are formed after the blood is contacted with an anticoagulant. In some embodiments, the anticoagulant includes heparin. In embodiments, the anticoagulant includes lithium heparin. In embodiments, the anticoagulant includes sodium heparin.

In embodiments, the chelator includes EDTA. In some embodiments, the present method includes contacting EDTA with a blood sample to a final EDTA concentration of no more than 60 mM, wherein the blood sample contains platelet clumps. In some embodiments, the present method includes contacting EDTA with a blood sample to a final EDTA concentration in the range of about 4 mM to about 20 mM, wherein the blood sample contains platelet clumps. In some embodiments, the method includes contacting EDTA with a blood sample to a final EDTA concentration of about 4 mM, wherein the blood sample contains platelet clumps. In some embodiments, the method includes contacting EDTA with a blood sample to a final EDTA concentration of about 4.5 mM, wherein the blood sample contains platelet clumps. In some embodiments, the method includes contacting EDTA with a blood sample to a final EDTA concentration of about 5 mM, wherein the blood sample contains platelet clumps. In some embodiments, the method includes contacting EDTA to with blood sample to a final EDTA concentration of about 5.5 mM, wherein the blood sample contains platelet clumps. In some embodiments, the method includes contacting EDTA with a blood sample to a final EDTA concentration of about 6 mM, wherein the blood sample contains platelet clumps. In some embodiments, the method includes contacting EDTA with a blood sample to a final EDTA concentration of about 6.5 mM, wherein the blood sample contains platelet clumps. In some embodiments, the method includes contacting EDTA with a blood sample to a final EDTA concentration of about 7 mM, wherein the blood sample contains platelet clumps. In some embodiments, the method includes contacting EDTA with a blood sample to a final EDTA concentration of about 7.5 mM, wherein the blood sample contains platelet clumps. In some embodiments, the method includes contacting EDTA with a blood sample to a final EDTA concentration of about 8 mM, wherein the blood sample contains platelet clumps. In some embodiments, the method includes contacting EDTA with a blood sample to a final EDTA concentration of about 8.5 mM, wherein the blood sample contains platelet clumps. In some embodiments, the method includes contacting EDTA with a blood sample to a final EDTA concentration of about 9 mM, wherein the blood sample contains platelet clumps. In some embodiments, the method includes contacting EDTA with a blood sample to a final EDTA concentration of about 9.5 mM, wherein the blood sample contains platelet clumps. In some embodiments, the method includes contacting EDTA with a blood sample to a final EDTA concentration of about 10 mM, wherein the blood sample contains platelet clumps. In some embodiments, the method includes contacting EDTA with a blood sample to a final EDTA concentration of about 10.5 mM, wherein the blood sample contains platelet clumps. In some embodiments, the method includes contacting EDTA with a blood sample to a final EDTA concentration of about 11 mM, wherein the blood sample contains platelet clumps. In some embodiments, the method includes contacting EDTA with a blood sample to a final EDTA concentration of about 11.5 mM, wherein the blood sample contains platelet clumps. In some embodiments, the method includes contacting EDTA with a blood sample to a final EDTA concentration of about 12 mM, wherein the blood sample contains platelet clumps. In some embodiments, the method includes contacting EDTA with a blood sample to a final EDTA concentration of about 12.5 mM, wherein the blood sample contains platelet clumps. In some embodiments, the method includes contacting EDTA with a blood sample to a final EDTA concentration of about 13 mM, wherein the blood sample contains platelet clumps. In some embodiments, the method includes contacting EDTA with a blood sample to a final EDTA concentration of about 13.5 mM, wherein the blood sample contains platelet clumps. In some embodiments, the method includes contacting EDTA with a blood sample to a final EDTA concentration of about 14 mM, wherein the blood sample contains platelet clumps. In some embodiments, the method includes contacting EDTA with a blood sample to a final EDTA concentration of about 14.5 mM, wherein the blood sample contains platelet clumps. In some embodiments, the method includes contacting EDTA with a blood sample to a final EDTA concentration of about 15 mM, wherein the blood sample contains platelet clumps. In some embodiments, the method includes contacting EDTA with a blood sample to a final EDTA concentration of about 15.5 mM, wherein the blood sample contains platelet clumps. In some embodiments, the method includes contacting EDTA with a blood sample to a final EDTA concentration of about 16 mM, wherein the blood sample contains platelet clumps. In some embodiments, the method includes contacting EDTA with a blood sample to a final EDTA concentration of about 16.5 mM, wherein the blood sample contains platelet clumps. In some embodiments, the method includes contacting EDTA with a blood sample to a final EDTA concentration of about 17 mM, wherein the blood sample contains platelet clumps. In some embodiments, the method includes contacting EDTA with a blood sample to a final EDTA concentration of about 17.5 mM, wherein the blood sample contains platelet clumps. In some embodiments, the method includes contacting EDTA with a blood sample to a final EDTA concentration of about 18 mM, wherein the blood sample contains platelet clumps. In some embodiments, the method includes contacting EDTA with a blood sample to a final EDTA concentration of about 18.5 mM, wherein the blood sample contains platelet clumps. In some embodiments, the method includes contacting EDTA with a blood sample to a final EDTA concentration of about 19 mM, wherein the blood sample contains platelet clumps. In some embodiments, the method includes contacting EDTA with a blood sample to a final EDTA concentration of about 19.5 mM, wherein the blood sample contains platelet clumps. In some embodiments, the method includes contacting EDTA with a blood sample to a final EDTA concentration of about 20 mM, wherein the blood sample contains platelet clumps. In some embodiments, the method includes contacting EDTA with a blood sample to a final EDTA concentration of about 21 mM, wherein the blood sample contains platelet clumps. In some embodiments, the method includes contacting EDTA with a blood sample to a final EDTA concentration of about 22 mM, wherein the blood sample contains platelet clumps. In some embodiments, the method includes contacting EDTA with a blood sample to a final EDTA concentration of about 23 mM, wherein the blood sample contains platelet clumps. In some embodiments, the method includes contacting EDTA with a blood sample to a final EDTA concentration of about 24 mM, wherein the blood sample contains platelet clumps. In some embodiments, the method includes contacting EDTA with a blood sample to a final EDTA concentration of about 25 mM, wherein the blood sample contains platelet clumps. In some embodiments, the method includes contacting EDTA with a blood sample to a final EDTA concentration of about 26 mM, wherein the blood sample contains platelet clumps. In some embodiments, the method includes contacting EDTA with a blood sample to a final EDTA concentration of about 27 mM, wherein the blood sample contains platelet clumps. In some embodiments, the method includes contacting EDTA with a blood sample to a final EDTA concentration of about 28 mM, wherein the blood sample contains platelet clumps. In some embodiments, the method includes contacting EDTA with a blood sample to a final EDTA concentration of about 29 mM, wherein the blood sample contains platelet clumps. In some embodiments, the method includes contacting EDTA with a blood sample to a final EDTA concentration of about 30 mM, wherein the blood sample contains platelet clumps. In some embodiments, the method includes contacting EDTA with a blood sample to a final EDTA concentration of about 31 mM, wherein the blood sample contains platelet clumps. In some embodiments, the method includes contacting EDTA with a blood sample to a final EDTA concentration of about 32 mM, wherein the blood sample contains platelet clumps. In some embodiments, the method includes contacting EDTA with a blood sample to a final EDTA concentration of about 33 mM, wherein the blood sample contains platelet clumps. In some embodiments, the method includes contacting EDTA with a blood sample to a final EDTA concentration of about 34 mM, wherein the blood sample contains platelet clumps. In some embodiments, the method includes contacting EDTA with a blood sample to a final EDTA concentration of about 35 mM, wherein the blood sample contains platelet clumps. In some embodiments, the method includes contacting EDTA with a blood sample to a final EDTA concentration of about 36 mM, wherein the blood sample contains platelet clumps. In some embodiments, the method includes contacting EDTA with a blood sample to a final EDTA concentration of about 37 mM, wherein the blood sample contains platelet clumps. In some embodiments, the method includes contacting EDTA with a blood sample to a final EDTA concentration of about 38 mM, wherein the blood sample contains platelet clumps. In some embodiments, the method includes contacting EDTA with a blood sample to a final EDTA concentration of about 39 mM, wherein the blood sample contains platelet clumps. In some embodiments, the method includes contacting EDTA with a blood sample to a final EDTA concentration of about 40 mM, wherein the blood sample contains platelet clumps. In some embodiments, the method includes contacting EDTA with a blood sample to a final EDTA concentration of about 41 mM, wherein the blood sample contains platelet clumps. In some embodiments, the method includes contacting EDTA with a blood sample to a final EDTA concentration of about 42 mM, wherein the blood sample contains platelet clumps. In some embodiments, the method includes contacting EDTA with a blood sample to a final EDTA concentration of about 43 mM, wherein the blood sample contains platelet clumps. In some embodiments, the method includes contacting EDTA with a blood sample to a final EDTA concentration of about 44 mM, wherein the blood sample contains platelet clumps. In some embodiments, the method includes contacting EDTA with a blood sample to a final EDTA concentration of about 45 mM, wherein the blood sample contains platelet clumps. In some embodiments, the method includes contacting EDTA with a blood sample to a final EDTA concentration of about 46 mM, wherein the blood sample contains platelet clumps. In some embodiments, the method includes contacting EDTA with a blood sample to a final EDTA concentration of about 47 mM, wherein the blood sample contains platelet clumps. In some embodiments, the method includes contacting EDTA with a blood sample to a final EDTA concentration of about 48 mM, wherein the blood sample contains platelet clumps. In some embodiments, the method includes contacting EDTA with a blood sample to a final EDTA concentration of about 49 mM, wherein the blood sample contains platelet clumps. In some embodiments, the method includes contacting EDTA with a blood sample to a final EDTA concentration of about 50 mM, wherein the blood sample contains platelet clumps. In some embodiments, the method includes contacting EDTA with a blood sample to a final EDTA concentration of about 51 mM, wherein the blood sample contains platelet clumps. In some embodiments, the method includes contacting EDTA with a blood sample to a final EDTA concentration of about 52 mM, wherein the blood sample contains platelet clumps. In some embodiments, the method includes contacting EDTA with a blood sample to a final EDTA concentration of about 53 mM, wherein the blood sample contains platelet clumps. In some embodiments, the method includes contacting EDTA with a blood sample to a final EDTA concentration of about 54 mM, wherein the blood sample contains platelet clumps. In some embodiments, the method includes contacting EDTA with a blood sample to a final EDTA concentration of about 55 mM, wherein the blood sample contains platelet clumps. In some embodiments, the method includes contacting EDTA with a blood sample to a final EDTA concentration of about 56 mM, wherein the blood sample contains platelet clumps. In some embodiments, the method includes contacting EDTA with a blood sample to a final EDTA concentration of about 57 mM, wherein the blood sample contains platelet clumps. In some embodiments, the method includes contacting EDTA with a blood sample to a final EDTA concentration of about 58 mM, wherein the blood sample contains platelet clumps. In some embodiments, the method includes contacting EDTA with a blood sample to a final EDTA concentration of about 59 mM, wherein the blood sample contains platelet clumps. In some embodiments, the method includes contacting EDTA with a blood sample to a final EDTA concentration of about 60 mM, wherein the blood sample contains platelet clumps. In some embodiments described herein, the platelet clumps are formed in vitro. In some embodiments described herein, the platelet clumps are formed after the blood sample is collected into a container. In some embodiments as described herein, the platelet clumps are formed after the blood is contacted with an anticoagulant. In some embodiments, the anticoagulant includes heparin. In embodiments, the anticoagulant includes lithium heparin. In embodiments, the anticoagulant includes sodium heparin. In embodiments, the anticoagulant is not EDTA.

In specific embodiments, the method includes contacting EDTA with a blood sample to a final EDTA concentration of about 18 mM, wherein the blood sample contains platelet clumps. Particularly, the blood sample is collected by drawing blood into a heparin-containing collection tube, and the platelet clumps are formed after the blood is contacted with heparin. Particularly, the heparin can be lithium heparin or sodium heparin. In specific embodiments, the method includes drawing blood from a subject into a heparin-containing container thus obtaining a blood sample, and contacting EDTA with the blood sample to a final EDTA concentration of about 18 mM.

In specific embodiments, the method includes contacting EDTA with a blood sample to a final EDTA concentration of about 16.5 mM, wherein the blood sample contains platelet clumps. Particularly, the blood sample is collected by drawing blood into a heparin-containing collection tube, and the platelet clumps are formed after the blood is contacted with heparin. Particularly, the heparin can be lithium heparin or sodium heparin. In specific embodiments, the method includes drawing blood from a subject into a heparin-containing container thus obtaining a blood sample, and contacting EDTA with the blood sample to a final EDTA concentration of about 16.5 mM.

In some embodiments, the present method includes contacting a chelator solution with a blood sample to a final chelator concentration in the range of about 5% to about 50% by volume, wherein the blood sample contains platelet clumps. In some embodiments, the present method includes contacting a chelator solution with a blood sample to a final chelator concentration of about 5% by volume, wherein the blood sample contains platelet clumps. In some embodiments, the present method includes contacting a chelator solution with a blood sample to a final chelator concentration of about 5.5% by volume, wherein the blood sample contains platelet clumps. In some embodiments, the present method includes contacting a chelator solution with a blood sample to a final chelator concentration of about 6% by volume, wherein the blood sample contains platelet clumps. In some embodiments, the present method includes contacting a chelator solution with a blood sample to a final chelator concentration of about 6.5% by volume, wherein the blood sample contains platelet clumps. In some embodiments, the present method includes contacting a chelator solution with a blood sample to a final chelator concentration of about 7% by volume, wherein the blood sample contains platelet clumps. In some embodiments, the present method includes contacting a chelator solution with a blood sample to a final chelator concentration of about 7.5% by volume, wherein the blood sample contains platelet clumps. In some embodiments, the present method includes contacting a chelator solution with a blood sample to a final chelator concentration of about 8% by volume, wherein the blood sample contains platelet clumps. In some embodiments, the present method includes contacting a chelator solution with a blood sample to a final chelator concentration of about 8.5% by volume, wherein the blood sample contains platelet clumps. In some embodiments, the present method includes contacting a chelator solution with a blood sample to a final chelator concentration of about 9% by volume, wherein the blood sample contains platelet clumps. In some embodiments, the present method includes contacting a chelator solution with a blood sample to a final chelator concentration of about 9.5% by volume, wherein the blood sample contains platelet clumps. In some embodiments, the present method includes contacting a chelator solution with a blood sample to a final chelator concentration of about 10% by volume, wherein the blood sample contains platelet clumps. In some embodiments, the present method includes contacting a chelator solution with a blood sample to a final chelator concentration of about 10.5% by volume, wherein the blood sample contains platelet clumps. In some embodiments, the present method includes contacting a chelator solution with a blood sample to a final chelator concentration of about 11% by volume, wherein the blood sample contains platelet clumps. In some embodiments, the present method includes contacting a chelator solution with a blood sample to a final chelator concentration of about 11.5% by volume, wherein the blood sample contains platelet clumps. In some embodiments, the present method includes contacting a chelator solution with a blood sample to a final chelator concentration of about 12% by volume, wherein the blood sample contains platelet clumps. In some embodiments, the present method includes contacting a chelator solution with a blood sample to a final chelator concentration of about 12.5% by volume, wherein the blood sample contains platelet clumps. In some embodiments, the present method includes contacting a chelator solution with a blood sample to a final chelator concentration of about 13% by volume, wherein the blood sample contains platelet clumps. In some embodiments, the present method includes contacting a chelator solution with a blood sample to a final chelator concentration of about 13.5% by volume, wherein the blood sample contains platelet clumps. In some embodiments, the present method includes contacting a chelator solution with a blood sample to a final chelator concentration of about 14% by volume, wherein the blood sample contains platelet clumps. In some embodiments, the present method includes contacting a chelator solution with a blood sample to a final chelator concentration of about 14.5% by volume, wherein the blood sample contains platelet clumps. In some embodiments, the present method includes contacting a chelator solution with a blood sample to a final chelator concentration of about 15% by volume, wherein the blood sample contains platelet clumps. In some embodiments, the present method includes contacting a chelator solution with a blood sample to a final chelator concentration of about 15.5% by volume, wherein the blood sample contains platelet clumps. In some embodiments, the present method includes contacting a chelator solution with a blood sample to a final chelator concentration of about 16% by volume, wherein the blood sample contains platelet clumps. In some embodiments, the present method includes contacting a chelator solution with a blood sample to a final chelator concentration of about 16.5% by volume, wherein the blood sample contains platelet clumps. In some embodiments, the present method includes contacting a chelator solution with a blood sample to a final chelator concentration of about 17% by volume, wherein the blood sample contains platelet clumps. In some embodiments, the present method includes contacting a chelator solution with a blood sample to a final chelator concentration of about 17.5% by volume, wherein the blood sample contains platelet clumps. In some embodiments, the present method includes contacting a chelator solution with a blood sample to a final chelator concentration of about 18% by volume, wherein the blood sample contains platelet clumps. In some embodiments, the present method includes contacting a chelator solution with a blood sample to a final chelator concentration of about 18.5% by volume, wherein the blood sample contains platelet clumps. In some embodiments, the present method includes contacting a chelator solution with a blood sample to a final chelator concentration of about 19% by volume, wherein the blood sample contains platelet clumps. In some embodiments, the present method includes contacting a chelator solution with a blood sample to a final chelator concentration of about 19.5% by volume, wherein the blood sample contains platelet clumps. In some embodiments, the present method includes contacting a chelator solution with a blood sample to a final chelator concentration of about 20% by volume, wherein the blood sample contains platelet clumps. In some embodiments, the present method includes contacting a chelator solution with a blood sample to a final chelator concentration of about 21% by volume, wherein the blood sample contains platelet clumps. In some embodiments, the present method includes contacting a chelator solution with a blood sample to a final chelator concentration of about 22% by volume, wherein the blood sample contains platelet clumps. In some embodiments, the present method includes contacting a chelator solution with a blood sample to a final chelator concentration of about 23% by volume, wherein the blood sample contains platelet clumps. In some embodiments, the present method includes contacting a chelator solution with a blood sample to a final chelator concentration of about 24% by volume, wherein the blood sample contains platelet clumps. In some embodiments, the present method includes contacting a chelator solution with a blood sample to a final chelator concentration of about 25% by volume, wherein the blood sample contains platelet clumps. In some embodiments, the present method includes contacting a chelator solution with a blood sample to a final chelator concentration of about 26% by volume, wherein the blood sample contains platelet clumps. In some embodiments, the present method includes contacting a chelator solution with a blood sample to a final chelator concentration of about 27% by volume, wherein the blood sample contains platelet clumps. In some embodiments, the present method includes contacting a chelator solution with a blood sample to a final chelator concentration of about 28% by volume, wherein the blood sample contains platelet clumps. In some embodiments, the present method includes contacting a chelator solution with a blood sample to a final chelator concentration of about 29% by volume, wherein the blood sample contains platelet clumps. In some embodiments, the present method includes contacting a chelator solution with a blood sample to a final chelator concentration of about 30% by volume, wherein the blood sample contains platelet clumps. In some embodiments, the present method includes contacting a chelator solution with a blood sample to a final chelator concentration of about 310% by volume, wherein the blood sample contains platelet clumps. In some embodiments, the present method includes contacting a chelator solution with a blood sample to a final chelator concentration of about 32% by volume, wherein the blood sample contains platelet clumps. In some embodiments, the present method includes contacting a chelator solution with a blood sample to a final chelator concentration of about 33% by volume, wherein the blood sample contains platelet clumps. In some embodiments, the present method includes contacting a chelator solution with a blood sample to a final chelator concentration of about 34% by volume, wherein the blood sample contains platelet clumps. In some embodiments, the present method includes contacting a chelator solution with a blood sample to a final chelator concentration of about 35% by volume, wherein the blood sample contains platelet clumps. In some embodiments, the present method includes contacting a chelator solution with a blood sample to a final chelator concentration of about 36% by volume, wherein the blood sample contains platelet clumps. In some embodiments, the present method includes contacting a chelator solution with a blood sample to a final chelator concentration of about 37% by volume, wherein the blood sample contains platelet clumps. In some embodiments, the present method includes contacting a chelator solution with a blood sample to a final chelator concentration of about 38% by volume, wherein the blood sample contains platelet clumps. In some embodiments, the present method includes contacting a chelator solution with a blood sample to a final chelator concentration of about 39% by volume, wherein the blood sample contains platelet clumps. In some embodiments, the present method includes contacting a chelator solution with a blood sample to a final chelator concentration of about 40% by volume, wherein the blood sample contains platelet clumps. In some embodiments, the present method includes contacting a chelator solution with a blood sample to a final chelator concentration of about 41% by volume, wherein the blood sample contains platelet clumps. In some embodiments, the present method includes contacting a chelator solution with a blood sample to a final chelator concentration of about 42% by volume, wherein the blood sample contains platelet clumps. In some embodiments, the present method includes contacting a chelator solution with a blood sample to a final chelator concentration of about 43% by volume, wherein the blood sample contains platelet clumps. In some embodiments, the present method includes contacting a chelator solution with a blood sample to a final chelator concentration of about 44% by volume, wherein the blood sample contains platelet clumps. In some embodiments, the present method includes contacting a chelator solution with a blood sample to a final chelator concentration of about 45% by volume, wherein the blood sample contains platelet clumps. In some embodiments, the present method includes contacting a chelator solution with a blood sample to a final chelator concentration of about 46% by volume, wherein the blood sample contains platelet clumps. In some embodiments, the present method includes contacting a chelator solution with a blood sample to a final chelator concentration of about 47% by volume, wherein the blood sample contains platelet clumps. In some embodiments, the present method includes contacting a chelator solution with a blood sample to a final chelator concentration of about 48% by volume, wherein the blood sample contains platelet clumps. In some embodiments, the present method includes contacting a chelator solution with a blood sample to a final chelator concentration of about 49% by volume, wherein the blood sample contains platelet clumps. In some embodiments, the present method includes contacting a chelator solution with a blood sample to a final chelator concentration of about 50% by volume, wherein the blood sample contains platelet clumps. In some embodiments described herein, the platelet clumps are formed in vitro. In some embodiments described herein, the platelet clumps are formed after the blood sample is collected into a container. In some embodiments as described herein, the platelet clumps are formed after the blood is contacted with an anticoagulant. In some embodiments, the anticoagulant includes heparin. In embodiments, the anticoagulant includes lithium heparin.

In embodiments, the chelator further includes citric acid or a salt thereof. In some embodiments, the citric acid or salt thereof is provided in an ACD solution as described herein. In some embodiments, the present method includes contacting an ACD solution with a blood sample to a final ACD concentration in the range of about 5% to about 50% by volume, wherein the blood sample contains platelet clumps. In some embodiments, the present method includes contacting an ACD solution with a blood sample to a final ACD concentration of about 5% by volume, wherein the blood sample contains platelet clumps. In some embodiments, the present method includes contacting an ACD solution with a blood sample to a final ACD concentration of about 5.5% by volume, wherein the blood sample contains platelet clumps. In some embodiments, the present method includes contacting an ACD solution with a blood sample to a final ACD concentration of about 6% by volume, wherein the blood sample contains platelet clumps. In some embodiments, the present method includes contacting an ACD solution with a blood sample to a final ACD concentration of about 6.5% by volume, wherein the blood sample contains platelet clumps. In some embodiments, the present method includes contacting an ACD solution with a blood sample to a final ACD concentration of about 7% by volume, wherein the blood sample contains platelet clumps. In some embodiments, the present method includes contacting an ACD solution with a blood sample to a final ACD concentration of about 7.5% by volume, wherein the blood sample contains platelet clumps. In some embodiments, the present method includes contacting an ACD solution with a blood sample to a final ACD concentration of about 8% by volume, wherein the blood sample contains platelet clumps. In some embodiments, the present method includes contacting an ACD solution with a blood sample to a final ACD concentration of about 8.5% by volume, wherein the blood sample contains platelet clumps. In some embodiments, the present method includes contacting an ACD solution with a blood sample to a final ACD concentration of about 9% by volume, wherein the blood sample contains platelet clumps. In some embodiments, the present method includes contacting an ACD solution with a blood sample to a final ACD concentration of about 9.5% by volume, wherein the blood sample contains platelet clumps. In some embodiments, the present method includes contacting an ACD solution with a blood sample to a final ACD concentration of about 10% by volume, wherein the blood sample contains platelet clumps. In some embodiments, the present method includes contacting an ACD solution with a blood sample to a final ACD concentration of about 10.5% by volume, wherein the blood sample contains platelet clumps. In some embodiments, the present method includes contacting an ACD solution with a blood sample to a final ACD concentration of about 110% by volume, wherein the blood sample contains platelet clumps. In some embodiments, the present method includes contacting an ACD solution with a blood sample to a final ACD concentration of about 11.5% by volume, wherein the blood sample contains platelet clumps. In some embodiments, the present method includes contacting an ACD solution with a blood sample to a final ACD concentration of about 12% by volume, wherein the blood sample contains platelet clumps. In some embodiments, the present method includes contacting an ACD solution with a blood sample to a final ACD concentration of about 12.5% by volume, wherein the blood sample contains platelet clumps. In some embodiments, the present method includes contacting an ACD solution with a blood sample to a final ACD concentration of about 13% by volume, wherein the blood sample contains platelet clumps. In some embodiments, the present method includes contacting an ACD solution with a blood sample to a final ACD concentration of about 13.5% by volume, wherein the blood sample contains platelet clumps. In some embodiments, the present method includes contacting an ACD solution with a blood sample to a final ACD concentration of about 14% by volume, wherein the blood sample contains platelet clumps. In some embodiments, the present method includes contacting an ACD solution with a blood sample to a final ACD concentration of about 14.5% by volume, wherein the blood sample contains platelet clumps. In some embodiments, the present method includes contacting an ACD solution with a blood sample to a final ACD concentration of about 15% by volume, wherein the blood sample contains platelet clumps. In some embodiments, the present method includes contacting an ACD solution with a blood sample to a final ACD concentration of about 15.5% by volume, wherein the blood sample contains platelet clumps. In some embodiments, the present method includes contacting an ACD solution with a blood sample to a final ACD concentration of about 16% by volume, wherein the blood sample contains platelet clumps. In some embodiments, the present method includes contacting an ACD solution with a blood sample to a final ACD concentration of about 16.5% by volume, wherein the blood sample contains platelet clumps. In some embodiments, the present method includes contacting an ACD solution with a blood sample to a final ACD concentration of about 17% by volume, wherein the blood sample contains platelet clumps. In some embodiments, the present method includes contacting an ACD solution with a blood sample to a final ACD concentration of about 17.5% by volume, wherein the blood sample contains platelet clumps. In some embodiments, the present method includes contacting an ACD solution with a blood sample to a final ACD concentration of about 18% by volume, wherein the blood sample contains platelet clumps. In some embodiments, the present method includes contacting an ACD solution with a blood sample to a final ACD concentration of about 18.5% by volume, wherein the blood sample contains platelet clumps. In some embodiments, the present method includes contacting an ACD solution with a blood sample to a final ACD concentration of about 19% by volume, wherein the blood sample contains platelet clumps. In some embodiments, the present method includes contacting an ACD solution with a blood sample to a final ACD concentration of about 19.5% by volume, wherein the blood sample contains platelet clumps. In some embodiments, the present method includes contacting an ACD solution with a blood sample to a final ACD concentration of about 20% by volume, wherein the blood sample contains platelet clumps. In some embodiments, the present method includes contacting an ACD solution with a blood sample to a final ACD concentration of about 21% by volume, wherein the blood sample contains platelet clumps. In some embodiments, the present method includes contacting an ACD solution with a blood sample to a final ACD concentration of about 22% by volume, wherein the blood sample contains platelet clumps. In some embodiments, the present method includes contacting an ACD solution with a blood sample to a final ACD concentration of about 23% by volume, wherein the blood sample contains platelet clumps. In some embodiments, the present method includes contacting an ACD solution with a blood sample to a final ACD concentration of about 24% by volume, wherein the blood sample contains platelet clumps. In some embodiments, the present method includes contacting an ACD solution with a blood sample to a final ACD concentration of about 25% by volume, wherein the blood sample contains platelet clumps. In some embodiments, the present method includes contacting an ACD solution with a blood sample to a final ACD concentration of about 26% by volume, wherein the blood sample contains platelet clumps. In some embodiments, the present method includes contacting an ACD solution with a blood sample to a final ACD concentration of about 27% by volume, wherein the blood sample contains platelet clumps. In some embodiments, the present method includes contacting an ACD solution with a blood sample to a final ACD concentration of about 28% by volume, wherein the blood sample contains platelet clumps. In some embodiments, the present method includes contacting an ACD solution with a blood sample to a final ACD concentration of about 29% by volume, wherein the blood sample contains platelet clumps. In some embodiments, the present method includes contacting an ACD solution with a blood sample to a final ACD concentration of about 30% by volume, wherein the blood sample contains platelet clumps. In some embodiments, the present method includes contacting an ACD solution with a blood sample to a final ACD concentration of about 31% by volume, wherein the blood sample contains platelet clumps. In some embodiments, the present method includes contacting an ACD solution with a blood sample to a final ACD concentration of about 32% by volume, wherein the blood sample contains platelet clumps. In some embodiments, the present method includes contacting an ACD solution with a blood sample to a final ACD concentration of about 33% by volume, wherein the blood sample contains platelet clumps. In some embodiments, the present method includes contacting an ACD solution with a blood sample to a final ACD concentration of about 34% by volume, wherein the blood sample contains platelet clumps. In some embodiments, the present method includes contacting an ACD solution with a blood sample to a final ACD concentration of about 35% by volume, wherein the blood sample contains platelet clumps. In some embodiments, the present method includes contacting an ACD solution with a blood sample to a final ACD concentration of about 36% by volume, wherein the blood sample contains platelet clumps. In some embodiments, the present method includes contacting an ACD solution with a blood sample to a final ACD concentration of about 37% by volume, wherein the blood sample contains platelet clumps. In some embodiments, the present method includes contacting an ACD solution with a blood sample to a final ACD concentration of about 38% by volume, wherein the blood sample contains platelet clumps. In some embodiments, the present method includes contacting an ACD solution with a blood sample to a final ACD concentration of about 39% by volume, wherein the blood sample contains platelet clumps. In some embodiments, the present method includes contacting an ACD solution with a blood sample to a final ACD concentration of about 40% by volume, wherein the blood sample contains platelet clumps. In some embodiments, the present method includes contacting an ACD solution with a blood sample to a final ACD concentration of about 41% by volume, wherein the blood sample contains platelet clumps. In some embodiments, the present method includes contacting an ACD solution with a blood sample to a final ACD concentration of about 42% by volume, wherein the blood sample contains platelet clumps. In some embodiments, the present method includes contacting an ACD solution with a blood sample to a final ACD concentration of about 43% by volume, wherein the blood sample contains platelet clumps. In some embodiments, the present method includes contacting an ACD solution with a blood sample to a final ACD concentration of about 44% by volume, wherein the blood sample contains platelet clumps. In some embodiments, the present method includes contacting an ACD solution with a blood sample to a final ACD concentration of about 45% by volume, wherein the blood sample contains platelet clumps. In some embodiments, the present method includes contacting an ACD solution with a blood sample to a final ACD concentration of about 46% by volume, wherein the blood sample contains platelet clumps. In some embodiments, the present method includes contacting an ACD solution with a blood sample to a final ACD concentration of about 47% by volume, wherein the blood sample contains platelet clumps. In some embodiments, the present method includes contacting an ACD solution with a blood sample to a final ACD concentration of about 48% by volume, wherein the blood sample contains platelet clumps. In some embodiments, the present method includes contacting an ACD solution with a blood sample to a final ACD concentration of about 49% by volume, wherein the blood sample contains platelet clumps. In some embodiments, the present method includes contacting an ACD solution with a blood sample to a final ACD concentration of about 50% by volume, wherein the blood sample contains platelet clumps. In some embodiments described herein, the platelet clumps are formed in vitro. In some embodiments described herein, the platelet clumps are formed after the blood sample is collected into a container. In some embodiments as described herein, the platelet clumps are formed after the blood is contacted with an anticoagulant. In some embodiments, the anticoagulant includes heparin. In embodiments, the anticoagulant includes lithium heparin. In embodiments, the anticoagulant includes sodium heparin. In embodiments, the anticoagulant is not EDTA.

In embodiments, the method includes contacting an ACD solution with a blood sample to a final ACD concentration of about 10% by volume, wherein the blood sample contains platelet clumps. Particularly, the blood sample is collected by drawing blood into a heparin-containing collection tube, and the platelet clumps are formed after the blood is contacted with heparin. Particularly, the heparin can be lithium heparin or sodium heparin. In specific embodiments, the method includes drawing blood from a subject into a heparin-containing container thus obtaining a blood sample, and contacting an ACD solution with the blood sample to a final ACD concentration of about 10% by volume.

In specific embodiments, the method includes contacting an ACD solution with a blood sample to a final ACD concentration of about 9.7% by volume, wherein the blood sample contains platelet clumps. Particularly, the blood sample is collected by drawing blood into a heparin-containing collection tube, and the platelet clumps are formed after the blood is contacted with heparin. Particularly, the heparin can be lithium heparin or sodium heparin. In specific embodiments, the method includes drawing blood from a subject into a heparin-containing container thus obtaining a blood sample, and contacting an ACD solution with the blood sample to a final ACD concentration of about 9.7% by volume.

In specific embodiments, the method includes contacting an ACD solution with a blood sample to a final ACD concentration of about 17.6% by volume, wherein the blood sample contains platelet clumps. Particularly, the blood sample is collected by drawing blood into a heparin-containing collection tube, and the platelet clumps are formed after the blood is contacted with heparin. Particularly, the heparin can be lithium heparin or sodium heparin In specific embodiments, the method includes drawing blood from a subject into a heparin-containing container thus obtaining a blood sample, and contacting an ACD solution with the blood sample to a final ACD concentration of about 17.6% by volume.

In embodiments, the chelator includes both EDTA and ACD. In some embodiments, the method includes contacting EDTA with a blood sample to a final EDTA concentration of no more than about 60 mM and contacting ACD with the blood sample to a final ACD concentration in the range of about 5% to about 50% by volume. In some embodiments, the method includes contacting EDTA with a blood sample to a final EDTA concentration in the range of about 4 mM to about 20 mM, and contacting ACD with the blood sample to a final ACD concentration in the range of about 5% to about 20% by volume. In some embodiments, the method includes contacting EDTA with a blood sample to a final EDTA concentration of about 4 mM, and contacting ACD with the blood sample to a final ACD concentration in the range of about 5% to about 50% by volume. In some embodiments, the method includes contacting EDTA with a blood sample to a final EDTA concentration of about 4.5 mM, and contacting ACD with the blood sample to a final ACD concentration in the range of about 5% to about 50% by volume. In some embodiments, the method includes contacting EDTA with a blood sample to a final EDTA concentration of about 5 mM, and contacting ACD with the blood sample to a final ACD concentration in the range of about 5% to about 50% by volume. In some embodiments, the method includes contacting EDTA with a blood sample to a final EDTA concentration of about 5.5 mM, and contacting ACD with the blood sample to a final ACD concentration in the range of about 5% to about 50% by volume. In some embodiments, the method includes contacting EDTA with a blood sample to a final EDTA concentration of about 6 mM, and contacting ACD with the blood sample to a final ACD concentration in the range of about 5% to about 50% by volume. In some embodiments, the method includes contacting EDTA with a blood sample to a final EDTA concentration of about 6.5 mM, and contacting ACD with the blood sample to a final ACD concentration in the range of about 5% to about 50% by volume. In some embodiments, the method includes contacting EDTA with a blood sample to a final EDTA concentration of about 7 mM, and contacting ACD with the blood sample to a final ACD concentration in the range of about 5% to about 50% by volume. In some embodiments, the method includes contacting EDTA with a blood sample to a final EDTA concentration of about 7.5 mM, and contacting ACD with the blood sample to a final ACD concentration in the range of about 5% to about 50% by volume. In some embodiments, the method includes contacting EDTA with a blood sample to a final EDTA concentration of about 8 mM, and contacting ACD with the blood sample to a final ACD concentration in the range of about 5% to about 50% by volume. In some embodiments, the method includes contacting EDTA with a blood sample to a final EDTA concentration of about 8.5 mM, and contacting ACD with the blood sample to a final ACD concentration in the range of about 5% to about 50% by volume. In some embodiments, the method includes contacting EDTA with a blood sample to a final EDTA concentration of about 9 mM, and contacting ACD with the blood sample to a final ACD concentration in the range of about 5% to about 50% by volume. In some embodiments, the method includes contacting EDTA with a blood sample to a final EDTA concentration of about 9.5 mM, and contacting ACD with the blood sample to a final ACD concentration in the range of about 5% to about 50% by volume. In some embodiments, the method includes contacting EDTA with a blood sample to a final EDTA concentration of about 10 mM, and contacting ACD with the blood sample to a final ACD concentration in the range of about 5% to about 50% by volume. In some embodiments, the method includes contacting EDTA with a blood sample to a final EDTA concentration of about 10.5 mM, and contacting ACD with the blood sample to a final ACD concentration in the range of about 5% to about 50% by volume. In some embodiments, the method includes contacting EDTA with a blood sample to a final EDTA concentration of about 11 mM, and contacting ACD with the blood sample to a final ACD concentration in the range of about 5% to about 50% by volume. In some embodiments, the method includes contacting EDTA with a blood sample to a final EDTA concentration of about 11.5 mM, and contacting ACD with the blood sample to a final ACD concentration in the range of about 5% to about 50% by volume. In some embodiments, the method includes contacting EDTA with a blood sample to a final EDTA concentration of about 12 mM, and contacting ACD with the blood sample to a final ACD concentration in the range of about 5% to about 50% by volume. In some embodiments, the method includes contacting EDTA with a blood sample to a final EDTA concentration of about 12.5 mM, and contacting ACD with the blood sample to a final ACD concentration in the range of about 5% to about 50% by volume. In some embodiments, the method includes contacting EDTA with a blood sample to a final EDTA concentration of about 13 mM, and contacting ACD with the blood sample to a final ACD concentration in the range of about 5% to about 50% by volume. In some embodiments, the method includes contacting EDTA with a blood sample to a final EDTA concentration of about 13.5 mM, and contacting ACD with the blood sample to a final ACD concentration in the range of about 5% to about 50% by volume. In some embodiments, the method includes contacting EDTA with a blood sample to a final EDTA concentration of about 14 mM, and contacting ACD with the blood sample to a final ACD concentration in the range of about 5% to about 50% by volume. In some embodiments, the method includes contacting EDTA with a blood sample to a final EDTA concentration of about 14.5 mM, and contacting ACD with the blood sample to a final ACD concentration in the range of about 5% to about 50% by volume. In some embodiments, the method includes contacting EDTA with a blood sample to a final EDTA concentration of about 15 mM, and contacting ACD with the blood sample to a final ACD concentration in the range of about 5% to about 50% by volume. In some embodiments, the method includes contacting EDTA with a blood sample to a final EDTA concentration of about 15.5 mM, and contacting ACD with the blood sample to a final ACD concentration in the range of about 5% to about 50% by volume. In some embodiments, the method includes contacting EDTA with a blood sample to a final EDTA concentration of about 16 mM, and contacting ACD with the blood sample to a final ACD concentration in the range of about 5% to about 50% by volume. In some embodiments, the method includes contacting EDTA with a blood sample to a final EDTA concentration of about 16.5 mM, and contacting ACD with the blood sample to a final ACD concentration in the range of about 5% to about 50% by volume. In some embodiments, the method includes contacting EDTA with a blood sample to a final EDTA concentration of about 17 mM, and contacting ACD with the blood sample to a final ACD concentration in the range of about 5% to about 50% by volume. In some embodiments, the method includes contacting EDTA with a blood sample to a final EDTA concentration of about 17.5 mM, and contacting ACD with the blood sample to a final ACD concentration in the range of about 5% to about 50% by volume. In some embodiments, the method includes contacting EDTA with a blood sample to a final EDTA concentration of about 18 mM, and contacting ACD with the blood sample to a final ACD concentration in the range of about 5% to about 50% by volume. In some embodiments, the method includes contacting EDTA with a blood sample to a final EDTA concentration of about 18.5 mM, and contacting ACD with the blood sample to a final ACD concentration in the range of about 5% to about 50% by volume. In some embodiments, the method includes contacting EDTA with a blood sample to a final EDTA concentration of about 19 mM, and contacting ACD with the blood sample to a final ACD concentration in the range of about 5% to about 50% by volume. In some embodiments, the method includes contacting EDTA with a blood sample to a final EDTA concentration of about 19.5 mM, and contacting ACD with the blood sample to a final ACD concentration in the range of about 5% to about 50% by volume. In some embodiments, the method includes contacting EDTA with a blood sample to a final EDTA concentration of about 20 mM, and contacting ACD with the blood sample to a final ACD concentration in the range of about 5% to about 50% by volume. In some embodiments, the method includes contacting EDTA with a blood sample to a final EDTA concentration of about 21 mM, and contacting ACD with the blood sample to a final ACD concentration in the range of about 5% to about 50% by volume. In some embodiments, the method includes contacting EDTA with a blood sample to a final EDTA concentration of about 22 mM, and contacting ACD with the blood sample to a final ACD concentration in the range of about 5% to about 50% by volume. In some embodiments, the method includes contacting EDTA with a blood sample to a final EDTA concentration of about 23 mM, and contacting ACD with the blood sample to a final ACD concentration in the range of about 5% to about 50% by volume. In some embodiments, the method includes contacting EDTA with a blood sample to a final EDTA concentration of about 24 mM, and contacting ACD with the blood sample to a final ACD concentration in the range of about 5% to about 50% by volume. In some embodiments, the method includes contacting EDTA with a blood sample to a final EDTA concentration of about 25 mM, and contacting ACD with the blood sample to a final ACD concentration in the range of about 5% to about 50% by volume. In some embodiments, the method includes contacting EDTA with a blood sample to a final EDTA concentration of about 26 mM, and contacting ACD with the blood sample to a final ACD concentration in the range of about 5% to about 50% by volume. In some embodiments, the method includes contacting EDTA with a blood sample to a final EDTA concentration of about 27 mM, and contacting ACD with the blood sample to a final ACD concentration in the range of about 5% to about 50% by volume. In some embodiments, the method includes contacting EDTA with a blood sample to a final EDTA concentration of about 28 mM, and contacting ACD with the blood sample to a final ACD concentration in the range of about 5% to about 50% by volume. In some embodiments, the method includes contacting EDTA with a blood sample to a final EDTA concentration of about 29 mM, and contacting ACD with the blood sample to a final ACD concentration in the range of about 5% to about 50% by volume. In some embodiments, the method includes contacting EDTA with a blood sample to a final EDTA concentration of about 30 mM, and contacting ACD with the blood sample to a final ACD concentration in the range of about 5% to about 50% by volume. In some embodiments, the method includes contacting EDTA with a blood sample to a final EDTA concentration of about 31 mM, and contacting ACD with the blood sample to a final ACD concentration in the range of about 5% to about 50% by volume. In some embodiments, the method includes contacting EDTA with a blood sample to a final EDTA concentration of about 32 mM, and contacting ACD with the blood sample to a final ACD concentration in the range of about 5% to about 50% by volume. In some embodiments, the method includes contacting EDTA with a blood sample to a final EDTA concentration of about 33 mM, and contacting ACD with the blood sample to a final ACD concentration in the range of about 5% to about 50% by volume. In some embodiments, the method includes contacting EDTA with a blood sample to a final EDTA concentration of about 34 mM, and contacting ACD with the blood sample to a final ACD concentration in the range of about 5% to about 50% by volume. In some embodiments, the method includes contacting EDTA with a blood sample to a final EDTA concentration of about 35 mM, and contacting ACD with the blood sample to a final ACD concentration in the range of about 5% to about 50% by volume. In some embodiments, the method includes contacting EDTA with a blood sample to a final EDTA concentration of about 36 mM, and contacting ACD with the blood sample to a final ACD concentration in the range of about 5% to about 50% by volume. In some embodiments, the method includes contacting EDTA with a blood sample to a final EDTA concentration of about 37 mM, and contacting ACD with the blood sample to a final ACD concentration in the range of about 5% to about 50% by volume. In some embodiments, the method includes contacting EDTA with a blood sample to a final EDTA concentration of about 38 mM, and contacting ACD with the blood sample to a final ACD concentration in the range of about 5% to about 50% by volume. In some embodiments, the method includes contacting EDTA with a blood sample to a final EDTA concentration of about 39 mM, and contacting ACD with the blood sample to a final ACD concentration in the range of about 5% to about 50% by volume. In some embodiments, the method includes contacting EDTA with a blood sample to a final EDTA concentration of about 40 mM, and contacting ACD with the blood sample to a final ACD concentration in the range of about 5% to about 50% by volume. In some embodiments, the method includes contacting EDTA with a blood sample to a final EDTA concentration of about 41 mM, and contacting ACD with the blood sample to a final ACD concentration in the range of about 5% to about 50% by volume. In some embodiments, the method includes contacting EDTA with a blood sample to a final EDTA concentration of about 42 mM, and contacting ACD with the blood sample to a final ACD concentration in the range of about 5% to about 50% by volume. In some embodiments, the method includes contacting EDTA with a blood sample to a final EDTA concentration of about 43 mM, and contacting ACD with the blood sample to a final ACD concentration in the range of about 5% to about 50% by volume. In some embodiments, the method includes contacting EDTA with a blood sample to a final EDTA concentration of about 44 mM, and contacting ACD with the blood sample to a final ACD concentration in the range of about 5% to about 50% by volume. In some embodiments, the method includes contacting EDTA with a blood sample to a final EDTA concentration of about 45 mM, and contacting ACD with the blood sample to a final ACD concentration in the range of about 5% to about 50% by volume. In some embodiments, the method includes contacting EDTA with a blood sample to a final EDTA concentration of about 46 mM, and contacting ACD with the blood sample to a final ACD concentration in the range of about 5% to about 50% by volume. In some embodiments, the method includes contacting EDTA with a blood sample to a final EDTA concentration of about 47 mM, and contacting ACD with the blood sample to a final ACD concentration in the range of about 5% to about 50% by volume. In some embodiments, the method includes contacting EDTA with a blood sample to a final EDTA concentration of about 48 mM, and contacting ACD with the blood sample to a final ACD concentration in the range of about 5% to about 50% by volume. In some embodiments, the method includes contacting EDTA with a blood sample to a final EDTA concentration of about 49 mM, and contacting ACD with the blood sample to a final ACD concentration in the range of about 5% to about 50% by volume. In some embodiments, the method includes contacting EDTA with a blood sample to a final EDTA concentration of about 50 mM, and contacting ACD with the blood sample to a final ACD concentration in the range of about 5% to about 50% by volume. In some embodiments, the method includes contacting EDTA with a blood sample to a final EDTA concentration of about 51 mM, and contacting ACD with the blood sample to a final ACD concentration in the range of about 5% to about 50% by volume. In some embodiments, the method includes contacting EDTA with a blood sample to a final EDTA concentration of about 52 mM, and contacting ACD with the blood sample to a final ACD concentration in the range of about 5% to about 50% by volume. In some embodiments, the method includes contacting EDTA with a blood sample to a final EDTA concentration of about 53 mM, and contacting ACD with the blood sample to a final ACD concentration in the range of about 5% to about 50% by volume. In some embodiments, the method includes contacting EDTA with a blood sample to a final EDTA concentration of about 54 mM, and contacting ACD with the blood sample to a final ACD concentration in the range of about 5% to about 50% by volume. In some embodiments, the method includes contacting EDTA with a blood sample to a final EDTA concentration of about 55 mM, and contacting ACD with the blood sample to a final ACD concentration in the range of about 5% to about 50% by volume. In some embodiments, the method includes contacting EDTA with a blood sample to a final EDTA concentration of about 56 mM, and contacting ACD with the blood sample to a final ACD concentration in the range of about 5% to about 50% by volume. In some embodiments, the method includes contacting EDTA with a blood sample to a final EDTA concentration of about 57 mM, and contacting ACD with the blood sample to a final ACD concentration in the range of about 5% to about 50% by volume. In some embodiments, the method includes contacting EDTA with a blood sample to a final EDTA concentration of about 58 mM, and contacting ACD with the blood sample to a final ACD concentration in the range of about 5% to about 50% by volume. In some embodiments, the method includes contacting EDTA with a blood sample to a final EDTA concentration of about 59 mM, and contacting ACD with the blood sample to a final ACD concentration in the range of about 5% to about 50% by volume. In some embodiments, the method includes contacting EDTA with a blood sample to a final EDTA concentration of about 60 mM, and contacting ACD with the blood sample to a final ACD concentration in the range of about 5% to about 50% by volume.

In embodiments, the chelator includes both EDTA and ACD. In some embodiments, the method includes contacting EDTA with a blood sample to a final EDTA concentration of no more than about 60 mM and contacting ACD with the blood sample to a final ACD concentration in the range of about 5% to about 50% by volume. In some embodiments, the method includes contacting EDTA with a blood sample to a final EDTA concentration in the range of about 4 mM to about 20 mM, and contacting ACD with the blood sample to a final ACD concentration in the range of about 5% to about 20% by volume. In some embodiments, the method includes contacting EDTA with a blood sample to a final EDTA concentration in the range of about 4 mM to about 60 mM, and contacting ACD with the blood sample to a final ACD concentration of about 5% by volume. In some embodiments, the method includes contacting EDTA with a blood sample to a final EDTA concentration in the range of about 4 mM to about 60 mM, and contacting ACD with the blood sample to a final ACD concentration of about 5.5% by volume. In some embodiments, the method includes contacting EDTA with a blood sample to a final EDTA concentration in the range of about 4 mM to about 60 mM, and contacting ACD with the blood sample to a final ACD concentration of about 6% by volume. In some embodiments, the method includes contacting EDTA with a blood sample to a final EDTA concentration in the range of about 4 mM to about 60 mM, and contacting ACD with the blood sample to a final ACD concentration of about 6.5% by volume. In some embodiments, the method includes contacting EDTA with a blood sample to a final EDTA concentration in the range of about 4 mM to about 60 mM, and contacting ACD with the blood sample to a final ACD concentration of about 7% by volume. In some embodiments, the method includes contacting EDTA with a blood sample to a final EDTA concentration in the range of about 4 mM to about 60 mM, and contacting ACD with the blood sample to a final ACD concentration of about 7.5% by volume. In some embodiments, the method includes contacting EDTA with a blood sample to a final EDTA concentration in the range of about 4 mM to about 60 mM, and contacting ACD with the blood sample to a final ACD concentration of about 8% by volume. In some embodiments, the method includes contacting EDTA with a blood sample to a final EDTA concentration in the range of about 4 mM to about 60 mM, and contacting ACD with the blood sample to a final ACD concentration of about 8.5% by volume. In some embodiments, the method includes contacting EDTA with a blood sample to a final EDTA concentration in the range of about 4 mM to about 60 mM, and contacting ACD with the blood sample to a final ACD concentration of about 9% by volume. In some embodiments, the method includes contacting EDTA with a blood sample to a final EDTA concentration in the range of about 4 mM to about 60 mM, and contacting ACD with the blood sample to a final ACD concentration of about 9.5% by volume. In some embodiments, the method includes contacting EDTA with a blood sample to a final EDTA concentration in the range of about 4 mM to about 60 mM, and contacting ACD with the blood sample to a final ACD concentration of about 10% by volume. In some embodiments, the method includes contacting EDTA with a blood sample to a final EDTA concentration in the range of about 4 mM to about 60 mM, and contacting ACD with the blood sample to a final ACD concentration of about 10.5% by volume. In some embodiments, the method includes contacting EDTA with a blood sample to a final EDTA concentration in the range of about 4 mM to about 60 mM, and contacting ACD with the blood sample to a final ACD concentration of about 11% by volume. In some embodiments, the method includes contacting EDTA with a blood sample to a final EDTA concentration in the range of about 4 mM to about 60 mM, and contacting ACD with the blood sample to a final ACD concentration of about 11.5% by volume. In some embodiments, the method includes contacting EDTA with a blood sample to a final EDTA concentration in the range of about 4 mM to about 60 mM, and contacting ACD with the blood sample to a final ACD concentration of about 12% by volume. In some embodiments, the method includes contacting EDTA with a blood sample to a final EDTA concentration in the range of about 4 mM to about 60 mM, and contacting ACD with the blood sample to a final ACD concentration of about 12.5% by volume. In some embodiments, the method includes contacting EDTA with a blood sample to a final EDTA concentration in the range of about 4 mM to about 60 mM, and contacting ACD with the blood sample to a final ACD concentration of about 13% by volume. In some embodiments, the method includes contacting EDTA with a blood sample to a final EDTA concentration in the range of about 4 mM to about 60 mM, and contacting ACD with the blood sample to a final ACD concentration of about 13.5% by volume. In some embodiments, the method includes contacting EDTA with a blood sample to a final EDTA concentration in the range of about 4 mM to about 60 mM, and contacting ACD with the blood sample to a final ACD concentration of about 14% by volume. In some embodiments, the method includes contacting EDTA with a blood sample to a final EDTA concentration in the range of about 4 mM to about 60 mM, and contacting ACD with the blood sample to a final ACD concentration of about 14.5% by volume. In some embodiments, the method includes contacting EDTA with a blood sample to a final EDTA concentration in the range of about 4 mM to about 60 mM, and contacting ACD with the blood sample to a final ACD concentration of about 15% by volume. In some embodiments, the method includes contacting EDTA with a blood sample to a final EDTA concentration in the range of about 4 mM to about 60 mM, and contacting ACD with the blood sample to a final ACD concentration of about 15.5% by volume. In some embodiments, the method includes contacting EDTA with a blood sample to a final EDTA concentration in the range of about 4 mM to about 60 mM, and contacting ACD with the blood sample to a final ACD concentration of about 16% by volume. In some embodiments, the method includes contacting EDTA with a blood sample to a final EDTA concentration in the range of about 4 mM to about 60 mM, and contacting ACD with the blood sample to a final ACD concentration of about 16.5% by volume. In some embodiments, the method includes contacting EDTA with a blood sample to a final EDTA concentration in the range of about 4 mM to about 60 mM, and contacting ACD with the blood sample to a final ACD concentration of about 17% by volume. In some embodiments, the method includes contacting EDTA with a blood sample to a final EDTA concentration in the range of about 4 mM to about 60 mM, and contacting ACD with the blood sample to a final ACD concentration of about 17.5% by volume. In some embodiments, the method includes contacting EDTA with a blood sample to a final EDTA concentration in the range of about 4 mM to about 60 mM, and contacting ACD with the blood sample to a final ACD concentration of about 18% by volume. In some embodiments, the method includes contacting EDTA with a blood sample to a final EDTA concentration in the range of about 4 mM to about 60 mM, and contacting ACD with the blood sample to a final ACD concentration of about 18.5% by volume. In some embodiments, the method includes contacting EDTA with a blood sample to a final EDTA concentration in the range of about 4 mM to about 60 mM, and contacting ACD with the blood sample to a final ACD concentration of about 19% by volume. In some embodiments, the method includes contacting EDTA with a blood sample to a final EDTA concentration in the range of about 4 mM to about 60 mM, and contacting ACD with the blood sample to a final ACD concentration of about 19.5% by volume. In some embodiments, the method includes contacting EDTA with a blood sample to a final EDTA concentration in the range of about 4 mM to about 60 mM, and contacting ACD with the blood sample to a final ACD concentration of about 20% by volume. In some embodiments, the method includes contacting EDTA with a blood sample to a final EDTA concentration in the range of about 4 mM to about 60 mM, and contacting ACD with the blood sample to a final ACD concentration of about 21% by volume. In some embodiments, the method includes contacting EDTA with a blood sample to a final EDTA concentration in the range of about 4 mM to about 60 mM, and contacting ACD with the blood sample to a final ACD concentration of about 22% by volume. In some embodiments, the method includes contacting EDTA with a blood sample to a final EDTA concentration in the range of about 4 mM to about 60 mM, and contacting ACD with the blood sample to a final ACD concentration of about 23% by volume. In some embodiments, the method includes contacting EDTA with a blood sample to a final EDTA concentration in the range of about 4 mM to about 60 mM, and contacting ACD with the blood sample to a final ACD concentration of about 24% by volume. In some embodiments, the method includes contacting EDTA with a blood sample to a final EDTA concentration in the range of about 4 mM to about 60 mM, and contacting ACD with the blood sample to a final ACD concentration of about 25% by volume. In some embodiments, the method includes contacting EDTA with a blood sample to a final EDTA concentration in the range of about 4 mM to about 60 mM, and contacting ACD with the blood sample to a final ACD concentration of about 26% by volume. In some embodiments, the method includes contacting EDTA with a blood sample to a final EDTA concentration in the range of about 4 mM to about 60 mM, and contacting ACD with the blood sample to a final ACD concentration of about 27% by volume. In some embodiments, the method includes contacting EDTA with a blood sample to a final EDTA concentration in the range of about 4 mM to about 60 mM, and contacting ACD with the blood sample to a final ACD concentration of about 28% by volume. In some embodiments, the method includes contacting EDTA with a blood sample to a final EDTA concentration in the range of about 4 mM to about 60 mM, and contacting ACD with the blood sample to a final ACD concentration of about 29% by volume. In some embodiments, the method includes contacting EDTA with a blood sample to a final EDTA concentration in the range of about 4 mM to about 60 mM, and contacting ACD with the blood sample to a final ACD concentration of about 30% by volume. In some embodiments, the method includes contacting EDTA with a blood sample to a final EDTA concentration in the range of about 4 mM to about 60 mM, and contacting ACD with the blood sample to a final ACD concentration of about 31% by volume. In some embodiments, the method includes contacting EDTA with a blood sample to a final EDTA concentration in the range of about 4 mM to about 60 mM, and contacting ACD with the blood sample to a final ACD concentration of about 32% by volume. In some embodiments, the method includes contacting EDTA with a blood sample to a final EDTA concentration in the range of about 4 mM to about 60 mM, and contacting ACD with the blood sample to a final ACD concentration of about 33% by volume. In some embodiments, the method includes contacting EDTA with a blood sample to a final EDTA concentration in the range of about 4 mM to about 60 mM, and contacting ACD with the blood sample to a final ACD concentration of about 34% by volume. In some embodiments, the method includes contacting EDTA with a blood sample to a final EDTA concentration in the range of about 4 mM to about 60 mM, and contacting ACD with the blood sample to a final ACD concentration of about 35% by volume. In some embodiments, the method includes contacting EDTA with a blood sample to a final EDTA concentration in the range of about 4 mM to about 60 mM, and contacting ACD with the blood sample to a final ACD concentration of about 36% by volume. In some embodiments, the method includes contacting EDTA with a blood sample to a final EDTA concentration in the range of about 4 mM to about 60 mM, and contacting ACD with the blood sample to a final ACD concentration of about 37% by volume. In some embodiments, the method includes contacting EDTA with a blood sample to a final EDTA concentration in the range of about 4 mM to about 60 mM, and contacting ACD with the blood sample to a final ACD concentration of about 38% by volume. In some embodiments, the method includes contacting EDTA with a blood sample to a final EDTA concentration in the range of about 4 mM to about 60 mM, and contacting ACD with the blood sample to a final ACD concentration of about 39% by volume. In some embodiments, the method includes contacting EDTA with a blood sample to a final EDTA concentration in the range of about 4 mM to about 60 mM, and contacting ACD with the blood sample to a final ACD concentration of about 40% by volume. In some embodiments, the method includes contacting EDTA with a blood sample to a final EDTA concentration in the range of about 4 mM to about 60 mM, and contacting ACD with the blood sample to a final ACD concentration of about 41% by volume. In some embodiments, the method includes contacting EDTA with a blood sample to a final EDTA concentration in the range of about 4 mM to about 60 mM, and contacting ACD with the blood sample to a final ACD concentration of about 42% by volume. In some embodiments, the method includes contacting EDTA with a blood sample to a final EDTA concentration in the range of about 4 mM to about 60 mM, and contacting ACD with the blood sample to a final ACD concentration of about 43% by volume. In some embodiments, the method includes contacting EDTA with a blood sample to a final EDTA concentration in the range of about 4 mM to about 60 mM, and contacting ACD with the blood sample to a final ACD concentration of about 44% by volume. In some embodiments, the method includes contacting EDTA with a blood sample to a final EDTA concentration in the range of about 4 mM to about 60 mM, and contacting ACD with the blood sample to a final ACD concentration of about 45% by volume. In some embodiments, the method includes contacting EDTA with a blood sample to a final EDTA concentration in the range of about 4 mM to about 60 mM, and contacting ACD with the blood sample to a final ACD concentration of about 46% by volume. In some embodiments, the method includes contacting EDTA with a blood sample to a final EDTA concentration in the range of about 4 mM to about 60 mM, and contacting ACD with the blood sample to a final ACD concentration of about 47% by volume. In some embodiments, the method includes contacting EDTA with a blood sample to a final EDTA concentration in the range of about 4 mM to about 60 mM, and contacting ACD with the blood sample to a final ACD concentration of about 48% by volume. In some embodiments, the method includes contacting EDTA with a blood sample to a final EDTA concentration in the range of about 4 mM to about 60 mM, and contacting ACD with the blood sample to a final ACD concentration of about 49% by volume. In some embodiments, the method includes contacting EDTA with a blood sample to a final EDTA concentration in the range of about 4 mM to about 60 mM, and contacting ACD with the blood sample to a final ACD concentration of about 50% by volume.

In specific embodiments, the method includes contacting EDTA with a blood sample to a final EDTA concentration of about 18 mM, and contacting an ACD solution with a blood sample to a final ACD concentration of about 9.6% by volume, wherein the blood sample contains platelet clumps. Particularly, the blood sample is collected by drawing blood into a heparin-containing collection tube, and the platelet clumps are formed after the blood is contacted with heparin. Particularly, the heparin can be lithium heparin or sodium heparin. In specific embodiments, the method includes drawing blood from a subject into a heparin-containing container thus obtaining a blood sample, and contacting EDTA with a blood sample to a final EDTA concentration of about 18 mM, and contacting an ACD solution with a blood sample to a final ACD concentration of about 9.6% by volume.

In specific embodiments, the method includes contacting EDTA with a blood sample to a final EDTA concentration of about 16.5 mM, and contacting an ACD solution with a blood sample to a final ACD concentration of about 17.6% by volume, wherein the blood sample contains platelet clumps. Particularly, the blood sample is collected by drawing blood into a heparin-containing collection tube, and the platelet clumps are formed after the blood is contacted with heparin. Particularly, the heparin can be lithium heparin or sodium heparin. In specific embodiments, the method includes drawing blood from a subject into a heparin-containing container thus obtaining a blood sample, and contacting EDTA with a blood sample to a final EDTA concentration of about 16.5 mM, and contacting an ACD solution with a blood sample to a final ACD concentration of about 17.6% by volume.

In some embodiments, the present method for dissolution of platelet clumps in a blood sample further includes applying a physical force with the blood sample. In some embodiments, the physical force is selected from vortexing, pipetting, sonication, acoustic mixing, mechanical vibrating (e.g., shaking, inverting or stirring), and other suitable forms of physical forces known in the art. In some embodiments, the physical force is applied by vortexing a mixture comprising the blood sample and the chelator. In some embodiments, the physical force is applied by repeatedly pipetting a mixture comprising the blood sample and the chelator. In some embodiments, the physical force is applied by subjecting a mixture comprising the blood sample and the chelator to sonication. In some embodiments, the physical force is applied to a mixture comprising the blood sample and the chelator through the use of an acoustic mixing apparatus. In some embodiments, the physical force is applied to a mixture comprising the blood sample and the chelator through the use of a mechanical vibration apparatus. Dissolving platelet clumps in a collected blood sample before subjecting the blood sample to an assay can improve accuracy of the blood assay, and prevents or reduces the risk of misdiagnosis of a condition in the blood-donor subject based on the outcome of the blood assay. Thus, as can be appreciated from the present disclosure, the present method for dissolution of platelet clumps in a blood sample can be used in connection with lab hematology practices, for example to collect, preserve or evaluate a blood sample collected for a blood test or assay.

In some embodiments, the present method for dissolution of platelet clumps in a blood sample can improve accuracy of an assay selected from a complete blood count (CBC) assay, a red blood cell (RBC) count assay, a white blood cell (WBC) count assay, a white blood cell (WBC) differential assay, a platelet count assay or a mean platelet volume (MPV) assay. In some embodiments, the assay is performed using an automated electric blood counter.

In some embodiments, the present method for dissolution of platelet clumps in a blood sample can prevent or reduce the risk of misdiagnosis of a condition such as pseudothrombocytopenia or pseudoleukocytosis. In some embodiments, the present method for dissolution of platelet clumps in a blood sample can prevent or reduce the risk of misdiagnosis of a condition that is known to contribute to thrombocytopenia or leukocytosis Conditions that contribute to thrombocytopenia or leukocytosis are known to those of ordinary skill in the art, and example of such conditions include but are not limited to aplastic anemia, vitamin B-12 deficiency, folate deficiency, iron deficiency, viral infections or cirrhosis.

Further, according to some embodiments of the present disclosure, provided herein are also methods for collecting a blood sample. In some embodiments, the method includes collecting a blood according to standard phlebotomy practice followed by contacting the collected blood sample with one or more chelator capable of reducing reactive $Ca^{2+}$ from the blood sample. Any chelator as described herein may be used in connection with the present method for collecting a blood sample. In some embodiment, the chelator is selected from diethylenetriaminepentaacetic acid (DTPA), 1,4,7,10-tetraazacyclododecane-1,4,7,10 tetraacetic acid (DOTA), 1,2-bis(o-aminophenoxy)ethane-N,N,N',N'-tetraacetic acid (BAPTA), ethylenediaminetetraacetic acid (EDTA), ethyleneglycol-bis((3-aminoethyl)-N,N,N',N'-tetraacetic acid (EGTA), N,N-bis(carboxymethyl)glycine (NTA), mercaptoacetylglycine (MAG3), 1,4,8,11-tetraazacyclotetradecane (CYCLAM), 1,4,7,10-tetraazacyclododecane, cyclen, 1,4,7-triazacyclononane (TACN), hydrazinonicotinamide (HYNIC), 2-hydroxypropane-1,2,3-tricarboxylic acid (citric acid), a salt form of anyone of the foregoing, or any combination of the foregoing.

In embodiments, the present method for collecting a blood sample includes drawing blood from a subject into an anticoagulant containing blood container thus forming a blood sample, followed by contacting the blood sample with one or more chelator as described herein. In some embodiments, the anticoagulant is heparin. In some embodiments, the anticoagulant is lithium heparin. In some embodiments, the anticoagulant is sodium heparin. In some embodiments, the anticoagulant is ACD. In some embodiments, the anticoagulant is not ACD. In some embodiments, the anticoagulant is EDTA. In some embodiments, the anticoagulant is not EDTA. In some embodiments, the anticoagulant is sodium citrate. In some embodiments, the anticoagulant is not sodium citrate. In some embodiments, the anticoagulant is sodium oxalate. In some embodiments, the anticoagulant is not sodium oxalate. In some embodiments, the anticoagulant is potassium oxalate. In some embodiments, the anticoagulant is not potassium oxalate. In some embodiments, the anticoagulant is CTAD. In some embodiments, the anticoagulant is not CTAD.

In specific embodiments, the present method for collecting a blood sample comprising drawing blood from a subject into a heparin-containing container to form the blood sample, and contacting the blood sample with a chelator comprising EDTA. In some embodiments, EDTA is provided in a buffer solution. In some embodiments, EDTA is dissolved in a phosphate buffer saline. In some embodiments, EDTA is contacted with the blood sample to a final EDTA concentration of no more than about 60 mM. In some embodiments, EDTA is contacted with the blood sample to a final EDTA concentration in the range of about 4 mM to about 20 mM. In some embodiments, EDTA is contacted with the blood sample to a final EDTA concentration of about 18 mM. In some embodiments, EDTA is contacted with the blood sample to a final EDTA concentration of about 16.5 mM. In other embodiments, EDTA is contacted with the blood sample to a final EDTA concentration as described elsewhere in the present application.

In specific embodiments, the present method for collecting a blood sample comprising drawing blood from a subject into a heparin-containing container to form the blood sample, and contacting the blood sample with a chelator comprising citric acid or a salt thereof. In some embodiments, the citric acid or a salt thereof is provided in an ACD solution. In some embodiments, the ACD solution is contacted with the blood sample to a final ACD concentration in the range of about 5% to about 50% by volume. In some embodiments, the ACD solution is contacted with the blood sample to a final ACD concentration of about 9.7% by volume. In some embodiments, the ACD solution is contacted with the blood sample to a final ACD concentration of about 10% by volume. In some embodiments, the ACD solution is contacted with the blood sample to a final ACD concentration of about 17.6% by volume. In some embodiments, the ACD solution is contacted with the blood sample to a final ACD concentration as described elsewhere in the present application.

In specific embodiments, the present method for collecting a blood sample comprising drawing blood from a subject into a heparin-containing container to form the blood sample, and contacting the blood sample with a chelator comprising EDTA and citric acid (or a salt of citric acid). In some embodiments, EDTA is contacted with the blood sample to a final EDTA concentration of about 18 mM and an ACD solution is contacted with the blood sample to a final ACD concentration of about 9.7% by volume. In some embodiments, EDTA is contacted with the blood sample to a final EDTA concentration of about 16.5 mM and an ACD solution is contacted with the blood sample to a final ACD concentration of about 17.6% by volume. In some embodiments, the method includes contacting the collected blood sample with EDTA and ACD at other concentrations as described herein.

In some embodiments, the present method for collecting a blood sample further includes applying a physical force to the blood sample. In some embodiments, the physical force is selected from vortexing, pipetting, sonication, acoustic mixing, mechanical vibrating (e.g., shaking, inverting, stirring), and other suitable forms of physical forces known in the art. In some embodiments, the physical force is applied by vortexing a mixture comprising the blood sample and the chelator. In some embodiments, the physical force is applied by repeatedly pipetting a mixture comprising the blood sample and the chelator. In some embodiments, the physical force is applied by subjecting a mixture comprising the blood sample and the chelator to sonication.

In some embodiments of the present method for collecting a blood sample, contacting the blood sample with one or more chelator as described herein is performed before subjecting the blood sample to an assay. According to the present disclosure, the present blood collection method can be performed before any blood assay using whole blood or plasma of the blood sample, and many such assays are known to those of ordinary skill in the art, including various immunoassays, platelet activation assays, and blood count assays such as a complete blood count (CBC) assay, a red blood cell (RBC) count assay, a white blood cell (WBC) count assay, a white blood cell (WBC) differential assay, a platelet count assay or a mean platelet volume (MPV) assay.

Further, according to some embodiments of the present disclosure, the present methods for dissolution of platelet clumps in a blood sample can be used in connection with one or more blood assays, including but not limited to clinical blood tests for diagnosing and/or monitoring in a patient a clinical condition of interest. Without being bound by theory, it is contemplated that platelet clumping interferes with certain blood assays but not others. For example, it is contemplated that certain immunoassays, platelet activation assays and blood count assays can benefit from pre-treating the blood sample with the compositions and methods of the present disclosure to dissolve platelet clumps in the blood. On the other hand, certain immunoassays and clinical chemistry assays are expected not to benefit from pre-treating the blood with the present compositions and methods.

Hence, provided herein are also methods for performing one or more blood assays using the same blood sample collected from a subject. In some embodiments, the method includes separating an aliquot from the blood sample, and treating the aliquot with the compositions and methods of the present disclosure to dissolve platelet clumps in the blood, followed by subjecting the treated aliquot to a first assay that is expected to benefit from the treatment. In some embodiments, the first assay is selected from one or more immunoassays, platelet activation assays and blood count assays. In some embodiments, the first assay is selected from a complete blood count (CBC) assay, a red blood cell (RBC) count assay, a white blood cell (WBC) count assay, a white blood cell (WBC) differential assay, a platelet count assay or a mean platelet volume (MPV) assay.

In some embodiments, the method further includes subjecting an aliquot of the blood sample not treated with the compositions and method of the present disclosure to a second assay. In some embodiments, the second assay is not expected to benefit from dissolving platelet clumps in the blood. In some embodiments, the second assay can be any immunoassay or chemistry assay known in the art. Further, according to some embodiments of the present disclosure, provided herein are also methods for reducing the occurrence of misdiagnosis of a condition in a subject. In some embodiments, the method includes treating a blood sample collected from the subject with a chelator capable of reducing reactive $Ca^{2+}$ from the blood sample. In some embodiments, the method further includes collecting the blood sample from the subject following standard phlebotomy practices.

Any chelator as described herein may be used in connection with the present method for reducing the occurrence of misdiagnosis of a condition in a subject. In some embodiment, the chelator is selected from diethylenetriaminepentaacetic acid (DTPA), 1,4,7, 0-tetraazacyclododecane-1,4,7, 10-tetraacetic acid (DOTA), 1,2-bis(o-aminophenoxy)ethane-N,N,N',N$^1$-tetraacetic acid (BAPTA), ethylenediaminetetraacetic acid (EDTA), ethyleneglycol-bis(13-aminoethyl)-N,N,N1',Nctetraacetic acid (EGTA), N,N-bis(carboxymethyl)glycine (NTA), mercaptoacetylglycine (MAG3), 1,4,8,11-tetraazacyclotetradecane (CYCLAM), 1,4,7,10-tetraazacyclododecane, cyclen, 1,4,7-triazacyclononane (TACN), hydrazinonicotinamide (HYNIC), 2-hydroxypropane-1,2,3-tricarboxylic acid (citric acid), a salt form of anyone of the foregoing, or any combination of the foregoing.

In embodiments, the present method for reducing the occurrence of misdiagnosis of a condition in a subject includes treating a blood sample collected into an anticoagulant-containing container with one or more chelator as described herein. In some embodiments, the present method for reducing the occurrence of misdiagnosis of a condition in a subject includes drawing blood from a subject into an anticoagulant-containing container thus forming a blood sample, followed by contacting the blood sample with one or more chelator as described herein. In some embodiments, the anticoagulant is heparin. In some embodiments, the anticoagulant is lithium heparin. In some embodiments, the anticoagulant is sodium heparin. In some embodiments, the anticoagulant is ACD. In some embodiments, the anticoagulant is not ACD. In some embodiments, the anticoagulant is EDTA. In some embodiments, the anticoagulant is not EDTA. In some embodiments, the anticoagulant is sodium citrate. In some embodiments, the anticoagulant is not sodium citrate. In some embodiments, the anticoagulant is sodium oxalate. In some embodiments, the anticoagulant is not sodium oxalate. In some embodiments, the anticoagulant is potassium oxalate. In some embodiments, the anticoagulant is not potassium oxalate. In some embodiments, the anticoagulant is CTAD. In some embodiments, the anticoagulant is not CTAD.

In specific embodiments, the present method for reducing occurrence of misdiagnosis of a condition in a subject comprising providing a blood sample collected from a subject by drawing blood into a heparin-containing container, contacting the blood sample with one or more chelator described herein, and subjecting the blood sample to an assay for diagnosing the condition.

In some embodiments of the present method for reducing occurrence of misdiagnosis of a condition in a subject, the chelator includes EDTA. In some embodiments, EDTA is provided in a buffer solution. In some embodiments, EDTA is dissolved in a phosphate buffer saline. In some embodiments, EDTA is contacted with the blood sample to a final EDTA concentration of no more than about 60 mM. In some embodiments, EDTA is contacted with the blood sample to a final EDTA concentration in the range of about 4 mM to about 20 mM. In some embodiments, EDTA is contacted with the blood sample to a final EDTA concentration of about 18 mM. In some embodiments, EDTA is contacted with the blood sample to a final EDTA concentration of about 16.5 mM. In other embodiments, EDTA is contacted with the blood sample to a final EDTA concentration as described elsewhere in the present application.

In specific embodiments, the present method for reducing occurrence of misdiagnosis of a condition in a subject, the chelator is citric acid or a salt thereof. In some embodiments, the citric acid or a salt thereof is provided in an ACD solution. In some embodiments, the ACD solution is contacted with the blood sample to a final ACD concentration in the range of about 5% to about 50% by volume. In some embodiments, the ACD solution is contacted with the blood sample to a final ACD concentration in the range of about 5% to about 20% by volume. In some embodiments, the ACD solution is contacted with the blood sample to a final ACD concentration of about 9.7% by volume. In some embodiments, the ACD solution is contacted with the blood sample to a final ACD concentration of about 10% by volume. In some embodiments, the ACD solution is contacted with the blood sample to a final ACD concentration of about 17.6% by volume. In some embodiments, the ACD solution is contacted with the blood sample to a final ACD concentration as described elsewhere in the present application.

In specific embodiments, the present method for reducing occurrence of misdiagnosis of a condition in a subject, the chelator includes EDTA and citric acid. In some embodiments, EDTA is contacted with the blood sample to a final EDTA concentration of about 18 mM and an ACD solution is contacted with the blood sample to a final ACD concentration of about 9.7% by volume. In some embodiments, EDTA is contacted with the blood sample to a final EDTA concentration of about 16.5 mM and an ACD solution is contacted with the blood sample to a final ACD concentration of about 17.6% by volume. In some embodiments, the method includes contacting the collected blood sample with EDTA and ACD at other concentrations as described herein.

In some embodiments, the present method for reducing occurrence of misdiagnosis of a condition in a subject further includes applying a physical force to the blood sample. In some embodiments, the physical force is selected from vortexing, pipetting, sonication, acoustic mixing, mechanical vibrating (e.g., shaking, inverting or stirring), and other suitable forms of physical forces known in the art. In some embodiments, the physical force is applied by vortexing a mixture comprising the blood sample and the chelator. In some embodiments, the physical force is applied by repeatedly pipetting a mixture comprising the blood sample and the chelator. In some embodiments, the physical force is applied by subjecting a mixture comprising the blood sample and the chelator to sonication. In some embodiments, the physical force is applied to a mixture comprising the blood sample and the chelator through the use of an acoustic mixing apparatus. In some embodiments, the physical force is applied to a mixture comprising the blood sample and the chelator through the use of a mechanical vibration apparatus.

In some embodiments of the present method for reducing occurrence of misdiagnosis of a condition in a subject, the assay for diagnosing the condition can be any assay that uses the whole blood or plasma of a blood sample, and many such assays are known to those of ordinary skill in the art, including various immunoassays, platelet activation assays, and blood count assays, such as a complete blood count (CBC) assay, a red blood cell (RBC) count assay, a white blood cell (WBC) count assay, a white blood cell (WBC) differential assay, a platelet count assay or a mean platelet volume (MPV) assay.

In some embodiments, the misdiagnosis is pseudothrombocytopenia, or pseudoleukocytosis, or other conditions that contribute to thrombocytopenia or leukocytosis. Conditions contribute to thrombocytopenia or leukocytosis are known to those of ordinary skill in the art, and example of such conditions include but are not limited to aplastic anemia, vitamin B-I2 deficiency, folate deficiency, iron deficiency, viral infections or cirrhosis.

Further according to the present disclosure, provided herein are also methods for detecting platelet clumping in a blood sample, and methods for evaluating quality of a blood sample. Particularly, a blood sample can be treated with a chelator capable of reducing reactive $Ca^{2+}$ in the blood sample, and provide information as to whether a sample should be subjected to an assay or discard.

In some embodiments, the method for detecting platelet clumping in a blood sample includes measuring a first platelet count in the blood sample; contacting the blood sample with a chelator capable of reducing reactive $Ca^{2+}$ from the blood sample; measuring a second platelet count in the blood sample; optionally comparing the first platelet count to the second platelet count; and detecting platelet clumping if the second platelet count is substantially increased compared to the first platelet count.

In some embodiments, the method for evaluating a quality of a blood sample includes measuring a first platelet count in the blood sample; contacting the blood sample with a chelator capable of reducing reactive $Ca^{2+}$ from the blood sample; measuring a second platelet count in the blood sample; optionally comparing the first platelet count to the second platelet count; and classifying the blood sample as having a poor quality if the second platelet count is substantially increased compared to the first platelet count.

Any chelator as described herein may be used in connection with the present method for detecting platelet clumping in a blood sample or the present method for evaluating a quality of a blood sample. In some embodiment, the chelator is selected from diethylenetriaminepentaacetic acid (DTPA), 1,4,7,10-tetraazacyclododecane-1,4,7,10-tetraacetic acid (DOTA), I,2-bis(o-aminophenoxy)ethane-N,N,N',N'-tetraacetic acid (BAPTA), ethylenediaminetetraacetic acid (EDTA), ethyleneglycol-bis(13-aminoethyl)-N,N,V,V-tetraacetic acid (EGTA), N,N-bis(carboxymethyl)glycine (NTA), mercaptoacetylglycine (MAG3), 1,4,8,1 1-tetraazacyclotetradecane (CYCLAM), 1,4,7,10-tetraazacyclododecane, cyclen, 1,4,7-triazacyclononane (TACN), hydrazinonicotinamide (HYNIC), 2-hydroxypropane-1,2,3-tricarboxylic acid (citric acid), a salt form of anyone of the foregoing, or any combination of the foregoing.

In embodiments, the present method for detecting platelet clumping in a blood sample or the present method for evaluating a quality of a blood sample includes treating a blood sample collected into an anticoagulant-containing container with one or more chelator as described herein. In some embodiments, the present method for detecting platelet clumping in a blood sample or the present method for evaluating a quality of a blood sample includes drawing blood from a subject into an anticoagulant-containing container thus forming a blood sample, followed by contacting the blood sample with one or more chelator as described herein. In some embodiments, the anticoagulant is heparin. In some embodiments, the anticoagulant is lithium heparin. In some embodiments, the anticoagulant is sodium heparin. In some embodiments, the anticoagulant is ACD. In some embodiments, the anticoagulant is not ACD. In some embodiments, the anticoagulant is EDTA. In some embodiments, the anticoagulant is not EDTA. In some embodiments, the anticoagulant is sodium citrate. In some embodiments, the anticoagulant is not sodium citrate. In some embodiments, the anticoagulant is sodium oxalate. In some embodiments, the anticoagulant is not sodium oxalate. In some embodiments, the anticoagulant is potassium oxalate. In some embodiments, the anticoagulant is not potassium oxalate. In some embodiments, the anticoagulant is CTAD. In some embodiments, the anticoagulant is not CTAD.

In some embodiments of the present method for detecting platelet clumping in a blood sample or the present method for evaluating a quality of a blood sample, the chelator includes EDTA. In some embodiments, EDTA is provided in a buffer solution. In some embodiments, EDTA is dissolved in a phosphate buffer saline. In some embodiments, EDTA is contacted with the blood sample to a final EDTA concentration of no more than about 60 mM. In some embodiments, EDTA is contacted with the blood sample to a final EDTA concentration in the range of about 4 mM to about 20 mM.

In some embodiments, EDTA is contacted with the blood sample to a final EDTA concentration of about 18 mM. In some embodiments, EDTA is contacted with the blood sample to a final EDTA concentration of about 16.5 mM. In other embodiments, EDTA is contacted with the blood sample to a final EDTA concentration as described elsewhere in the present application.

In specific embodiments, the present method for detecting platelet clumping in a blood sample or the present method for evaluating a quality of a blood sample, the chelator is citric acid or a salt thereof. In some embodiments, the citric acid or a salt thereof is provided in an ACD solution. In some embodiments, the ACD solution is contacted with the blood sample to a final ACD concentration in the range of about 5% to about 50% by volume. In some embodiments, the ACD solution is contacted with the blood sample to a final ACD concentration in the range of about 5% to about 20% by volume. In some embodiments, the ACD solution is contacted with the blood sample to a final ACD concentration of about 9.7% by volume. In some embodiments, the ACD solution is contacted with the blood sample to a final ACD concentration of about 10% by volume. In some embodiments, the ACD solution is contacted with the blood sample to a final ACD concentration of about 17.6% by volume. In some embodiments, the ACD solution is contacted with the blood sample to a final ACD concentration as described elsewhere in the present application.

In specific embodiments, the present method for detecting platelet clumping in a blood sample or the present method for evaluating a quality of a blood sample, the chelator includes EDTA and citric acid (or a salt of citric acid). In some embodiments, EDTA is contacted with the blood sample to a final EDTA concentration of about 18 mM and an ACD solution is contacted with the blood sample to a final ACD concentration of about 9.7% by volume. In some embodiments, EDTA is contacted with the blood sample to a final EDTA concentration of about 16.5 mM and an ACD solution is contacted with the blood sample to a final ACD concentration of about 17.6% by volume. In some embodiments, the method includes contacting the collected blood sample with EDTA and ACD at other concentrations as described herein.

In some embodiments, the present method for detecting platelet clumping in a blood sample or the present method for evaluating a quality of a blood sample further includes applying a physical force to the blood sample. In some embodiments, the physical force is selected from vortexing, pipetting, sonication, acoustic mixing, mechanical vibrating (e.g., shaking, inverting, stirring), and other suitable forms of physical forces known in the art. In some embodiments, the physical force is applied by vortexing a mixture comprising the blood sample and the chelator. In some embodiments, the physical force is applied by repeatedly pipetting a mixture comprising the blood sample and the chelator. In some embodiments, the physical force is applied by subjecting a mixture comprising the blood sample and the chelator to sonication. In some embodiments, the physical force is applied to a mixture comprising the blood sample and the chelator through the use of an acoustic mixing apparatus. In some embodiments, the physical force is applied to a mixture comprising the blood sample and the chelator through the use of a mechanical vibration apparatus.

In some embodiments, the second platelet count is substantially increased compared to the first platelet count if the increase is more than about 1% of the second platelet count. In some embodiments, the second platelet count is substantially increased compared to the first platelet count if the increase is more than about 2% of the second platelet count. In some embodiments, the second platelet count is substantially increased compared to the first platelet count if the increase is more than about 5% of the second platelet count. In some embodiments, the second platelet count is substantially increased compared to the first platelet count if the increase is more than about 10% of the second platelet count. In some embodiments, the second platelet count is substantially increased compared to the first platelet count if the increase is more than about 20% of the second platelet count. In some embodiments, the second platelet count is substantially increased compared to the first platelet count if the increase is more than about 30% of the second platelet count. In some embodiments, the second platelet count is substantially increased compared to the first platelet count if the increase is more than about 40% of the second platelet count. In some embodiments, the second platelet count is substantially increased compared to the first platelet count if the increase is more than about 50% of the second platelet count. In some embodiments, the second platelet count is substantially increased compared to the first platelet count if the increase is more than about 60% of the second platelet count. In some embodiments, the second platelet count is substantially increased compared to the first platelet count if the increase is more than about 70% of the second platelet count. In some embodiments, the second platelet count is substantially increased compared to the first platelet count if the increase is more than about 80% of the second platelet count. In some embodiments, the second platelet count is substantially increased compared to the first platelet count if the increase is more than about 90% of the second platelet count. In some embodiments, the second platelet count is substantially increased compared to the first platelet count if the increase is more than about 95% of the second platelet count.

In some embodiments, when the second platelet count substantially increased compared to the first platelet count, the present methods further comprise discarding the blood sample, or recommending collecting a new blood sample from a subject.

In some embodiments, when the second platelet count is substantially the same compared to the first platelet count, the present method further includes subjecting the blood sample to an assay. In some embodiments, the assay can be any assay that uses the whole blood or plasma of the blood sample, and many such assays are known to those of ordinary skill in the art, including various immunoassays, platelet activation assays, and blood count assays, such as a complete blood count (CBC) assay, a red blood cell (RBC) count assay, a white blood cell (WBC) count assay, a white blood cell (WBC) differential assay, a platelet count assay or a mean platelet volume (MPV) assay.

Kits

According to another embodiment of the present disclosure, provided herein are also kits of compositions that can be used in connection with the present methods. In some embodiments, the kit includes a container for collecting a blood sample. The container can be any container suitable for housing a blood sample. For example, blood collection containers that are used in standard phlebotomy practices or commercially available for blood collection can be used in connection with the present disclosure, and are known to those of ordinary skill in the art. In some embodiments, the container for collecting the blood sample is a capillary container.

In some embodiments, the kit further includes a composition comprising one or more anticoagulant. In some embodiments, the composition comprising one or more anticoagulant is in the container for collecting the blood sample. In some embodiments, the one or more anticoagulant is selected from sodium citrate, sodium heparin, lithium heparin, EDTA, sodium oxalate, potassium oxalate, citric acid, ACD, CTAD, or any combination thereof. In some embodiments, the anticoagulant is heparin. In specific embodiments, the anticoagulant is lithium heparin. In specific embodiments, the anticoagulant is sodium heparin.

In some embodiments, the composition comprising one or more anticoagulant is housed in the container for collecting the blood sample such that the blood is in contact with the one or more anticoagulant after drawn into the container. In some of these embodiments, the container for collecting the blood sample includes heparin. In specific embodiments, the container for collecting the blood sample includes lithium heparin. In specific embodiments, the container for collecting the blood sample includes sodium heparin. In specific embodiments, the container for collecting the blood includes heparin and no other anticoagulant. In specific embodiments, the container for collecting the blood includes lithium heparin and no other anticoagulant. In specific embodiments, the container for collecting the blood includes sodium heparin and no other anticoagulant.

In some embodiments, the container for collecting a blood sample includes one or more anticoagulant that is not EDTA. In some embodiments, the container for collecting a blood sample includes one or more anticoagulant that is not sodium citrate. In some embodiments, the container for collecting a blood sample includes one or more anticoagulant that is not sodium oxalate. In some embodiments, the container for collecting a blood sample includes one or more anticoagulant that is not potassium oxalate. In some embodiments, the container for collecting a blood sample includes one or more anticoagulant that is not citric acid. In some embodiments, the container for collecting a blood sample includes one or more anticoagulant that is not ACD. In some embodiments, the container for collecting a blood sample includes one or more anticoagulant that is not CTAD.

In some embodiments, the kit further includes a composition comprising a chelator as described herein, wherein the composition comprising the chelator is not hosed in the container for collecting the blood sample. In some embodiments, the composition comprising one or more chelator selected from diethylenetriaminepentaacetic acid (DTPA), 1,4,7,10-tetraazacyclododecane-1,4,7,10-tetraacetic acid (DOTA), 1,2-bis(o-aminophenoxy)ethane-N,N,N',N'-tetraacetic acid (BAPTA), ethylenediaminetetraacetic acid (EDTA), ethyleneglycol-bis((i-aminoethyl)-N,N,V,N'-tetraacetic acid (EGTA), N,N-bis(carboxymethyl)glycine (NTA), mercaptoacetylglycine (MAG3), 1,4,8,11-tetraazacyclotetradecane (CYCLAM), 1,4,7,10-tetraazacyclododecane, cyclen, 1,4,7-triazacyclononane (TACN), hydrazinonicotinamide (HYNIC), 2-hydroxypropane-1,2,3-tricarboxylic acid (citric acid), a salt form of anyone of the foregoing, or any combination of the foregoing.

In some embodiments, the composition comprising a chelator is a composition comprising EDTA, wherein the EDTA is not in the container for collecting the blood sample. In some embodiments, the composition comprising EDTA is in the form of a solution comprising EDTA. In some embodiments, the solution comprising EDTA is a buffered saline solution. In some embodiments, the composition comprising EDTA includes EDTA dissolved in a phosphate saline solution (PBS). In some embodiments, the composition comprising EDTA includes a solid surface coated with EDTA. In some embodiments, the solid surface coated with EDTA is the surface of a container. In some embodiments, the surface coated with EDTA is the surface of a capillary tube. In some embodiments, the solid surface coated with EDTA is not part of the container for collecting a blood sample.

In some embodiments, the composition comprising a chelator is a composition comprising citric acid or a salt thereof. In some embodiments, the composition comprising citric acid or a salt thereof is an ACD solution. In some embodiments, the composition comprising a chelator includes a first composition comprising EDTA and a second composition comprising citric acid or a salt thereof. In some embodiments, the first and second compositions are housed in separate containers. In some embodiments, the first and second compositions are housed in the same container. In some embodiments, the first and second compositions are the same composition.

In specific embodiments, the kit includes a container for collecting a blood sample, wherein the container houses a composition comprising heparin such that blood is in contact with heparin after being drawn into the container. In some embodiments, the kit further includes a composition comprising EDTA that is not housed in the container for collecting the blood sample. In specific embodiments, the heparin is lithium heparin. In specific embodiments, the heparin is sodium heparin. In specific embodiments, the composition comprising EDTA is produced by dissolving EDTA into a buffered saline solution. In specific embodiments, the composition comprising EDTA is produced by dissolving EDTA into a phosphate saline solution (PBS).

In specific embodiments, the kit includes a container for collecting a blood sample, wherein the container houses a composition comprising heparin such that blood is in contact with heparin after being drawn into the container. In some embodiments, the kit further includes a composition comprising an ACD solution that is not housed in the container for collecting the blood sample. In specific embodiments, the heparin is lithium heparin. In specific embodiments, the heparin is sodium heparin. In specific embodiments, the ACD solution is Solution A as described herein. In specific embodiments, the ACD solution is Solution B as described herein.

In specific embodiments, the kit includes a container for collecting a blood sample, wherein the container houses a composition comprising heparin such that blood is in contact with heparin after being drawn into the container. In some embodiments, the kit further includes a first composition comprising EDTA and a second composition comprising an ACD solution, wherein the first and second compositions are not housed in the container for collecting the blood sample. In specific embodiments, the heparin is lithium heparin. In specific embodiments, the heparin is sodium heparin. In specific embodiments, the composition comprising EDTA is produced by dissolving EDTA in a buffered saline solution. In specific embodiments, the composition comprising EDTA is produced by dissolving EDTA into a phosphate buffer saline (PBS). In specific embodiments, the ACD solution is Solution A as described herein. In specific embodiments, the ACD solution is Solution B as described herein. In some embodiments, the first and second composition are housed in separate containers.

In specific embodiments, the kit includes a container for collecting a blood sample, wherein the container houses a composition comprising heparin such that blood is in contact with heparin after being drawn into the container. In some embodiments, the kit further includes a composition comprising EDTA and citric acid or a salt of citric acid, where the composition is not housed in the container for collecting the blood sample. In specific embodiments, the heparin is lithium heparin. In specific embodiments, the heparin is sodium heparin. In specific embodiments, the composition comprising EDTA and citric acid or a salt of citric acid is produced by dissolving EDTA and citric acid or a salt of citric acid into a buffered saline solution. In specific embodiments, the composition comprising EDTA and citric acid or a salt of citric acid is produced by dissolving EDTA and citric acid or a salt of citric acid into a phosphate buffer saline (PBS).

EXAMPLES

Examples related to the present invention are described below. In most cases, alternative techniques can be used. The examples are intended to be illustrative and are not limiting or restrictive to the scope of the invention. For example, where a blood sample are treated with a chelator composition or analyzed as described herein, the compositions are prepared or analyses are performed following a protocol or a Scheme, it is understood that conditions may vary, for example, any of the solvents, reaction times, reagents, temperatures, supplements, work up conditions, or other reaction parameters may be varied. Commercial reagents were used as received.

Example 1

Blood Collection

Blood used in the following examples came from either venipuncture or fingerstick samples. Standard phlebotomy practices were followed to collect donor venipuncture blood in either BD Vacutainer' EDTA blood collection tubes or BD Vacutainer' PST lithium heparin plasma separation blood collection tubes. Standard phlebotomy practices were followed to collect donor fingerstick blood in either LiHep SAFE-T-FILL™ tubes or EDTA SAFE-T-FIL™ tubes. All blood samples were stored at room temperature until use. Samples were analyzed within 12 hours of blood collection.

Significant amount of platelet clumping occurred in both venipuncture and fingerstick blood collected in Lithium heparin tubes. Platelet clumping appeared to occur spontaneously following blood collection. For all studies, an EDTA control sample was used in which blood from either venipuncture or fingerstick were collected into EDTA tubes. EDTA venipuncture control samples were collected into EDTA blood collection tubes from the same donor using the same port as the lithium heparin samples. All EDTA control samples contained no detectible platelet clumping.

Example 2

EDTA Alone Reversed Platelet Clumping in LiHep Samples

A series of anti-coagulants are tested for their respective effect in reversing platelet clumping formed in blood samples. Fresh fingerstick blood samples were collected into EDTA and LiHep blood collection tubes as described above. Concentrated EDTA was dried for at least one hour at room temperature in microcentrifuge tubes using a vacuum drying oven. Immediately following collection, a 200 uL fraction of the LiHep sample ("LiHep+EDTA") was passed through two separate EDTA SAFE-T-FIL™ capillary tubes for a double exposure to the EDTA anticoagulant resulting in a final concentration of about 8.8 mM EDTA in blood Another 200 uL fraction ("LiHep+TruEDTA") was added to the previously prepared vacuum-dried EDTA resulting in a final concentration of 20 mM EDTA in blood. At 30 minutes post collection, another 200 uL fraction of the LiHep sample ("LiHep+EDTA 30 min") was passed through two separate EDTA SAFE-T-FILL™ capillary tubes for a double exposure to the EDTA anticoagulant. All samples were pulse vortexed with three, five-second bursts at the maximum vortex setting immediately following addition to EDTA. At 30 minutes post collection, all samples were then stained using an Azure B solution from the Differential Quik Stain™ Kit (Modified Giemsa) from Polysciences, Inc. Azure B was added to blood sample at a 1:1 ratio and pipette mixed. A standard blood smear was performed on all samples. Cells were imaged using the bright field setting on an Echo Revolve™ microscope at 20× magnification. Between six to seven different fields of view were captured. Images were analyzed using Image J and the number of platelets present in each field of view was manually counted. Error bars indicate standard deviation of the data set.

As shown in FIG. 1, it was observed that EDTA treatment was able to significantly recover the platelet count in blood samples collected in LiHep tubes. A control group of blood samples collected in EDTA tubes ("EDTA Control") and a control of blood samples collected in LiHep tubes without EDTA treatment ("LiHep Control") were included for comparison.

The reduction of platelet clumping by EDTA suggested that the cause of the clumping is the presence of calcium (possibly due to platelet activation), as the mechanism of action for EDTA is to form calcium salts to remove calcium from the solution and thereby making it unavailable to the coagulation pathway.

Example 3

High Concentration EDTA Negatively Impacts Morphology of White Blood Cells

Next, it was examined whether EDTA exposure impacts blood cell morphology. Particularly, fresh fingerstick blood samples were collected into EDTA and LiHep blood collection tubes. Concentrated EDTA was dried for at least one hour at room temperature in microcentrifuge tubes using a vacuum drying oven. A 200 uL fraction of the LiHep sample ("1×") was added to the previously prepared vacuum-dried EDTA resulting in a final concentration of 20 mM EDTA in blood. Another 200 uL fraction of the LiHep sample ("3×") was added to the previously prepared vacuum-dried EDTA resulting in a final concentration of 60 mM EDTA in blood. All samples were pulse vortexed with three, five-second bursts at the maximum vortex setting. Samples were then stained using AO. AO was added to blood sample at a final concentration of 10 ug/mL, pipette mixed and incubated for 5 minutes at room temperature. A standard blood smear was performed on all samples. A coverslip was placed on top of the sample immediately following the blood smear to prevent sample from drying out. Cells were imaged using the fluorescence setting on an Echo Revolve microscope. AO is a pH-sensitive cationic dye. When bound to double-stranded DNA (for example, in the nuclear compartment), the dye fluoresces green with an excitation maximum at 502 nm and emission maximum at 525 nm. When bound to single stranded DNA and RNA (for example, in the cytoplasm) or when the dye is in an acidic environment (for example, in lysosomes), the dye fluoresces red with an excitation maximum at 460 nm and emission maximum at 650 nm. To capture the green fluorescence of AO, which labeled the nuclei of white blood cells, a blue LED light source with excitation filter at 470/40 nm was paired with emission filter at 525/50 nm, with a dichroic mirror at 495 nm. To capture the red fluorescence of AO, which labeled the cytoplasmic compartments of white blood cells, the same blue LED light source was paired with emission filter at 635/60 nm with a dichroic mirror at 600 nm. Several representative fields of view were captured. Images were cropped using Image J™.

Figure 2:
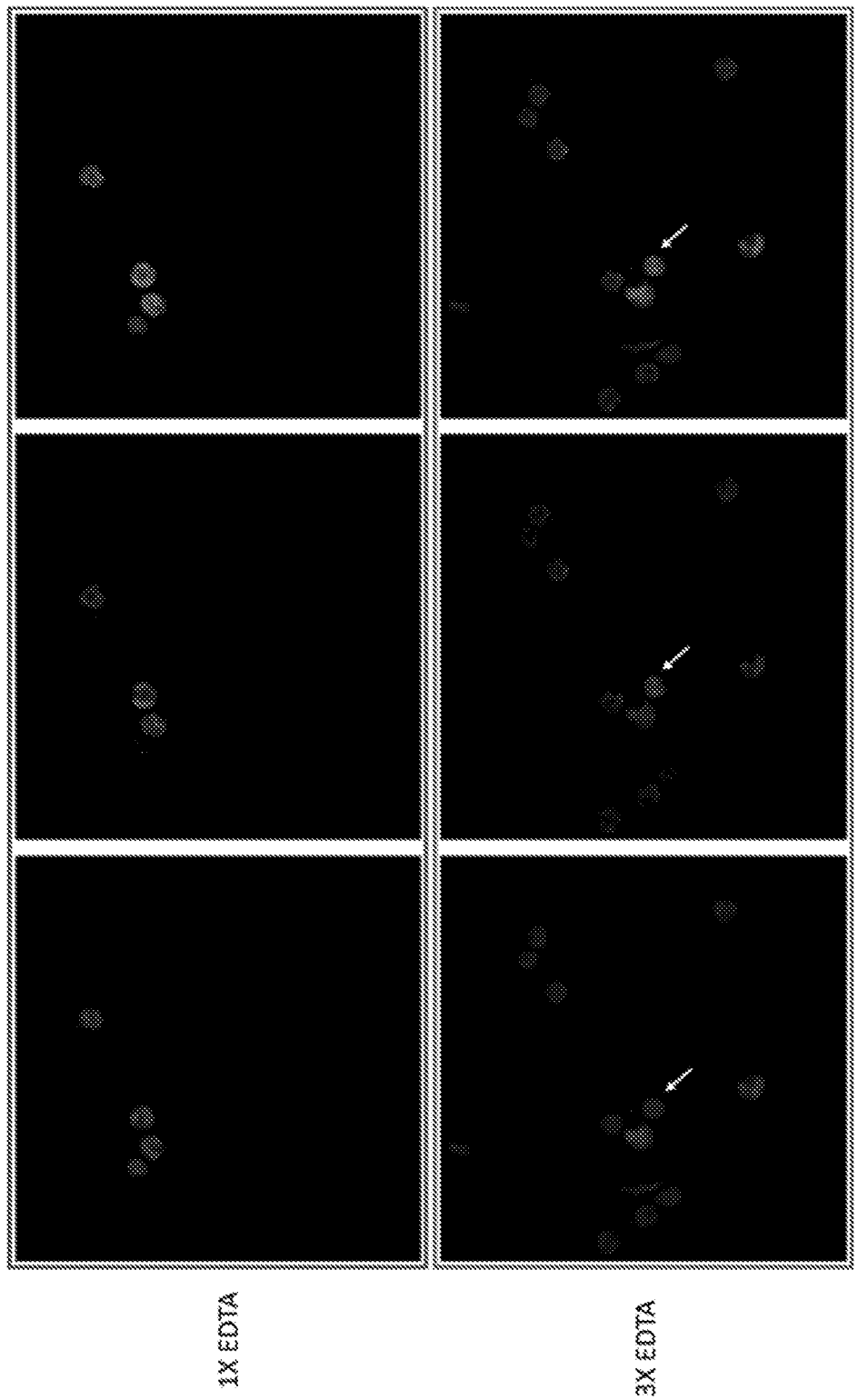
FIG. 2 shows that high concentration EDTA negatively impact white blood cell morphology (white arrows). 1×EDTA sample contained 20 mM EDTA; 3×EDTA sample contained 60 mM EDTA. Samples stained with acridine orange (AO).

It was observed that exposure the blood sample to 60 M EDTA negatively impacted the morphology of white blood cells (FIG. 2).

Example 4

Acid Citrate Dextrose Reversed Platelet Clumping in LiHep Samples

Next, another anti-coagulant capable of decreasing calcium concentration in a blood sample was tested for its ability of reversing platelet clumping in the blood sample.

Acid citrate dextrose (ACD) is a mixture of citric acid, sodium citrate and dextrose in water, and is also a calcium chelator. In the following study, ACD was tested either alone or in combination with EDTA for its effect in reversing platelet clumping in a blood sample.

Particularly, fresh fingerstick blood samples were collected into EDTA and LiHep blood collection tubes as described above. Concentrated EDTA was dried for at least one hour at room temperature in microcentrifuge tubes using a vacuum drying oven. Following sample collection, a 100 uL fraction of the LiHep sample ("LiHep+EDTA") was added to the previously prepared vacuum-dried EDTA resulting in a final concentration of roughly 17.6 mM EDTA in blood. Another 200 uL fraction of the LiHep sample ("LiHep+TruEDTA") was added to the previously prepared vacuum-dried EDTA resulting in a final concentration of 20 mM EDTA in blood. A third 200 uL fraction of LiHep sample was added to ACD resulting in a final concentration of 9.7% ACD (vol/vol) in blood. All samples were pulse vortexed with three, five-second bursts at the maximum vortex setting. Samples were then stained using an Azure B solution from the Differential Quik Stain™ Kit (Modified Giemsa) from Polysciences, Inc. Azure B was added to blood sample at a 1:1 ratio and pipette mixed. A standard blood smear was performed on all samples. Cells were imaged using the bright field setting on an Echo Revolve microscope at 20× magnification. Between six to eight different fields of view were captured. Images were analyzed using Image J and the number of platelets present in each field of view was manually counted. Error bars indicate standard deviation of the data set.

Figure 3:
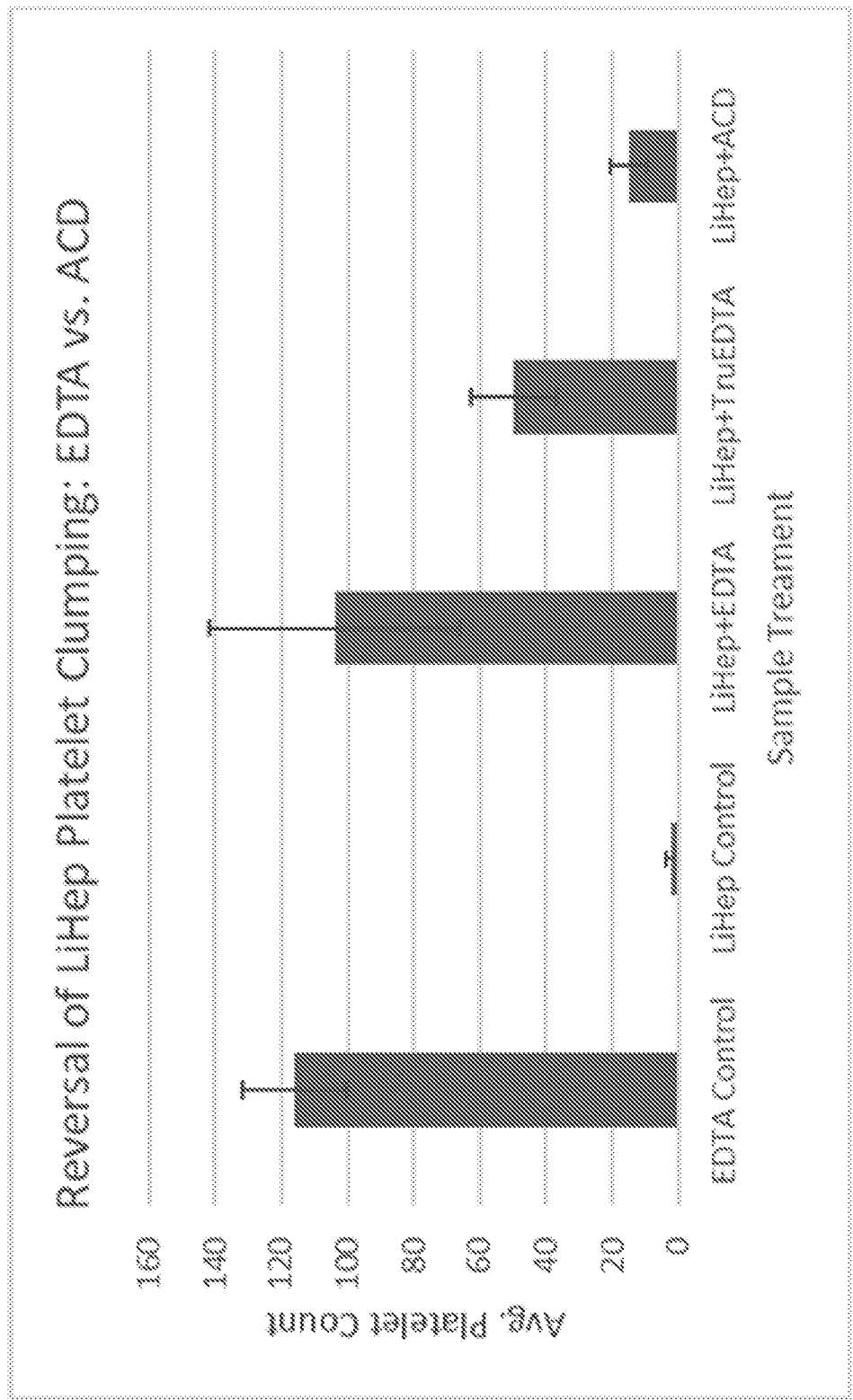
FIG. 3 shows that EDTA treatment of blood sample collected in LiHep tubes reversed platelet clumping by about 40% as compared to control groups. X axis indicates sample type; Y axis shows average platelet counts in blood samples per unit field of view.

As shown in FIG. 3, it was observed that treatment of LiHep blood sample with 9.7% ACD (vol/vol) resulted in about 15% recovery of platelet counts ("LiHep+ACD"). The same blood sample treated with EDTA (either at 17.6 mM concentration "LiHep+EDTA" or at 20 mM concentration "LiHep+TruEDTA") resulted in greater than 40% recovery of platelet counts. The EDTA Control group and the LiHep Control group were included for comparison.

Example 5

Composition Containing EDTA and ACD Reversed Platelet Clumping

Next, it was tested whether EDTA and ACD can produce a synergistic effect in reversing platelet clumping in a blood sample. Particularly, as shown in Example 1, exposing a blood sample to a high concentration of EDTA (e.g., 60 mM) may cause abnormal blood cell morphology. Thus, it was also examined whether a composition comprising both EDTA and ACD was able to reverse platelet clumping at a lower EDTA concentration without damaging the blood cells.

Figure 4:
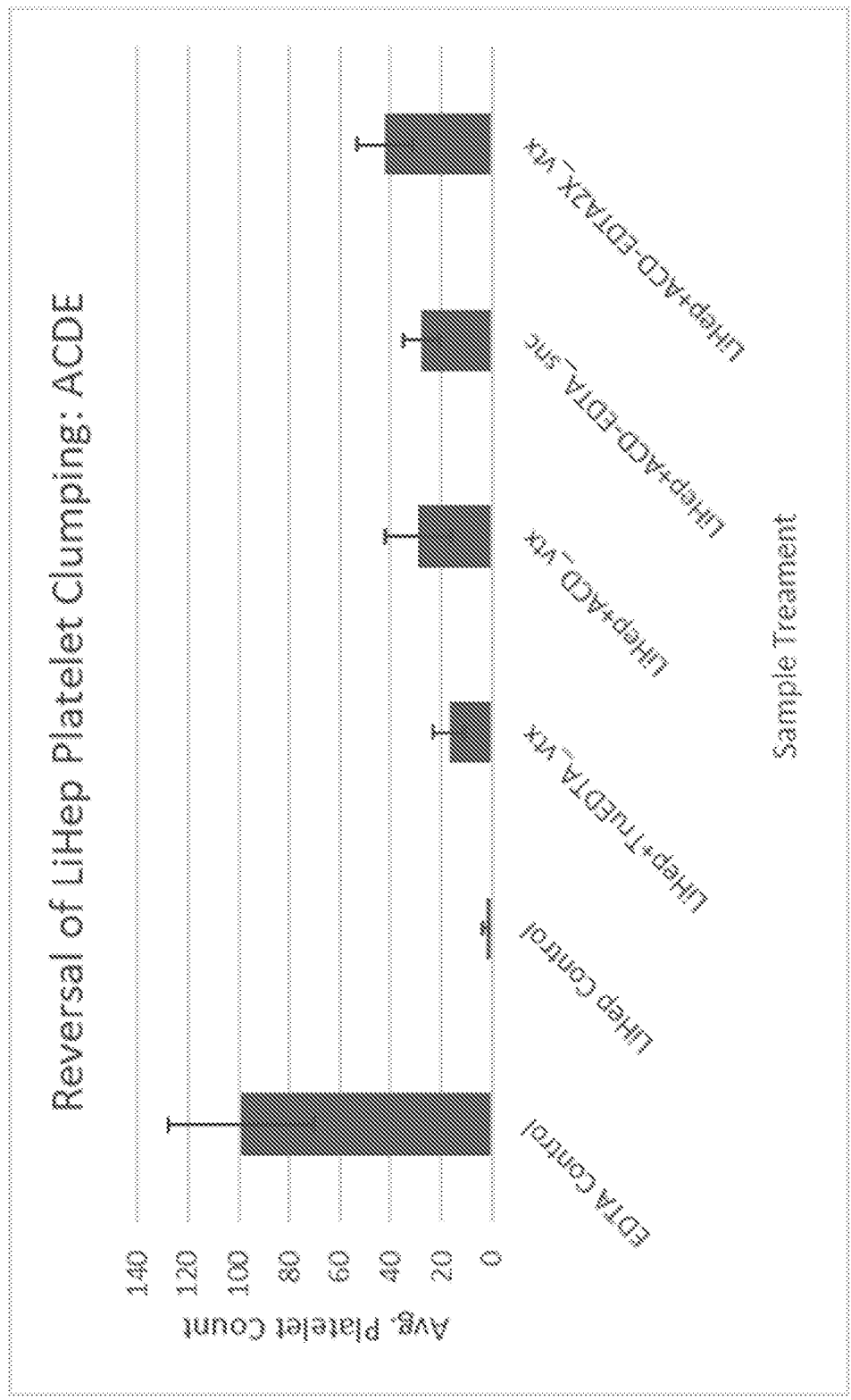
FIG. 4 shows a composition comprising EDTA and ACD (ACDE) increased dissolution of platelet clumps formed in blood samples as compared to EDTA alone. X axis indicates sample type; Y axis shows average platelet counts in blood samples per unit field of view. Sample stained with Azure B.

Particularly, fresh fingerstick blood samples were collected into EDTA and LiHep blood collection tubes as described above. Concentrated EDTA was dried for at least one hour at room temperature in microcentrifuge tubes using a vacuum drying oven. A 200 uL fraction of the LiHep sample ("LiHep+TruEDTA vtx") was added to the previously prepared vacuum-dried EDTA resulting in a final concentration of 20 mM EDTA in blood. Another 200 uL fraction of LiHep sample ("LiHep+ACD_vtx") was added to ACD resulting in a final concentration of 24% ACD (vol/vol) in blood. These two samples were pulse vortexed with three, five-second bursts at the maximum vortex setting. A third 200 uL LiHep fraction ("LiHep+ACD-EDTA2×vtx") was added to a tube containing dried EDTA reconstituted with ACD resulting in a final concentration of 9.7% ACD (vol/vol) and 18 mM EDTA in blood. This sample was vortexed with three ten-second pulses the maximum vortex setting. A final 200 uL LiHep fraction ("LiHep+ACD-EDTA_snc") was added to a tube containing dried EDTA reconstituted with ACD resulting in a final concentration of 9.7% ACD (vol/vol) and 18 mM EDTA in blood. This sample was sonicated in a water bath sonicator for I minute. All samples were then stained using an Azure B solution from the Differential Quik Stain™ Kit (Modified Giemsa) from Polysciences, Inc. Azure B was added to blood sample at a 1:1 ratio and pipette mixed. A standard blood smear was performed on all samples. Cells were imaged using the bright field setting on an Echo Revolve microscope at 20× magnification. Between five to eight different fields of view were captured. Images were analyzed using Image J and the number of platelets present in each field of view was manually counted. Error bars indicate standard deviation of the data set. As shown in FIG. 4, it was observed that treating LiHep blood samples with both ACD and EDTA and subject the sample to vortexing or sonication significantly recovered platelet counts in the blood sample.

Example 6

Azure 13 Staining Contributed to Platelet Clumping Observed Under Microscope

It was also observed that staining the blood sample with Azure B for visualizing and imaging the platelets also contributed to the platelet clumping phenomenon. To avoid the artifact, a different fluorescent stain, AO, was used instead of Azure B.

Particularly, fresh venipuncture blood samples were collected into EDTA and LiHep blood collection tubes as described above. Concentrated EDTA was dried for at least one hour at room temperature in microcentrifuge tubes using a vacuum drying oven. Following collection, a 200 uL fraction of the LiHep sample ("ACDE vtx") was added to a tube containing dried EDTA reconstituted with ACD resulting in a final concentration of 9.7% ACD (vol/vol) and 18 mM EDTA in blood. This sample was pulse vortexed with three, ten second bursts at the maximum vortex setting. A second 200 uL LiHep fraction ("ACDE sonication") was added to a tube containing dried EDTA reconstituted with ACD resulting in a final concentration of 9.7% ACD (vol/ vol) and 18 mM EDTA in blood. This sample was sonicated in a water bath sonicator for 1 minute. A third 200 uL LiHep fraction ("ACDE_Tecan") was added to a tube containing dried EDTA reconstituted with ACD resulting in a final concentration of 9.7% ACD (vol/vol) and 18 mM EDTA in blood. This sample was pipette mixed using a Tecan Carvo Omni™ automated pipettor. To mix, 150 uL of sample was aspirated and dispensed at 1 mL/s 0.5 mm from the bottom of the tube. This mixing cycle was repeated 30 times. All samples were then stained using an acridine orange (AO). AO was added to blood sample at a final concentration of 10 ug/mL, pipette mixed and incubated for 5 minutes at room temperature. A standard blood smear was performed on all samples. A coverslip was placed on top of the sample immediately following the blood smear to prevent sample drying out. Cells were imaged using the fluorescence setting on an Echo Revolve™ microscope. AO is a pH-sensitive cationic dye. When bound to double-stranded DNA (for example, in the nuclear compartment), the dye fluoresces green with an excitation maximum at 502 nm and emission maximum at 525 nm. When bound to single stranded DNA and RNA (for example, in the cytoplasm) or when the dye is in an acidic environment (for example, in lysosomes), the dye fluoresces red with an excitation maximum at 460 nm and emission maximum at 650 nm. To capture the green fluorescence of AO, which labeled the nuclei of white blood cells, a blue LED light source with excitation filter at 470/40 nm was paired with emission filter at 525/50 nm, with a dichroic mirror at 495 nm. To capture the red fluorescence of AO, which labeled the cytoplasmic compartments of white blood cells, the same blue LED light source was paired with emission filter at 635/60 nm with a dichroic mirror at 600 nm. Between five to eight different fields of view were captured. Images were analyzed using Image J and the number of platelets present in each field of view was manually counted. Error bars indicate standard deviation of the data set.

Figure 5:
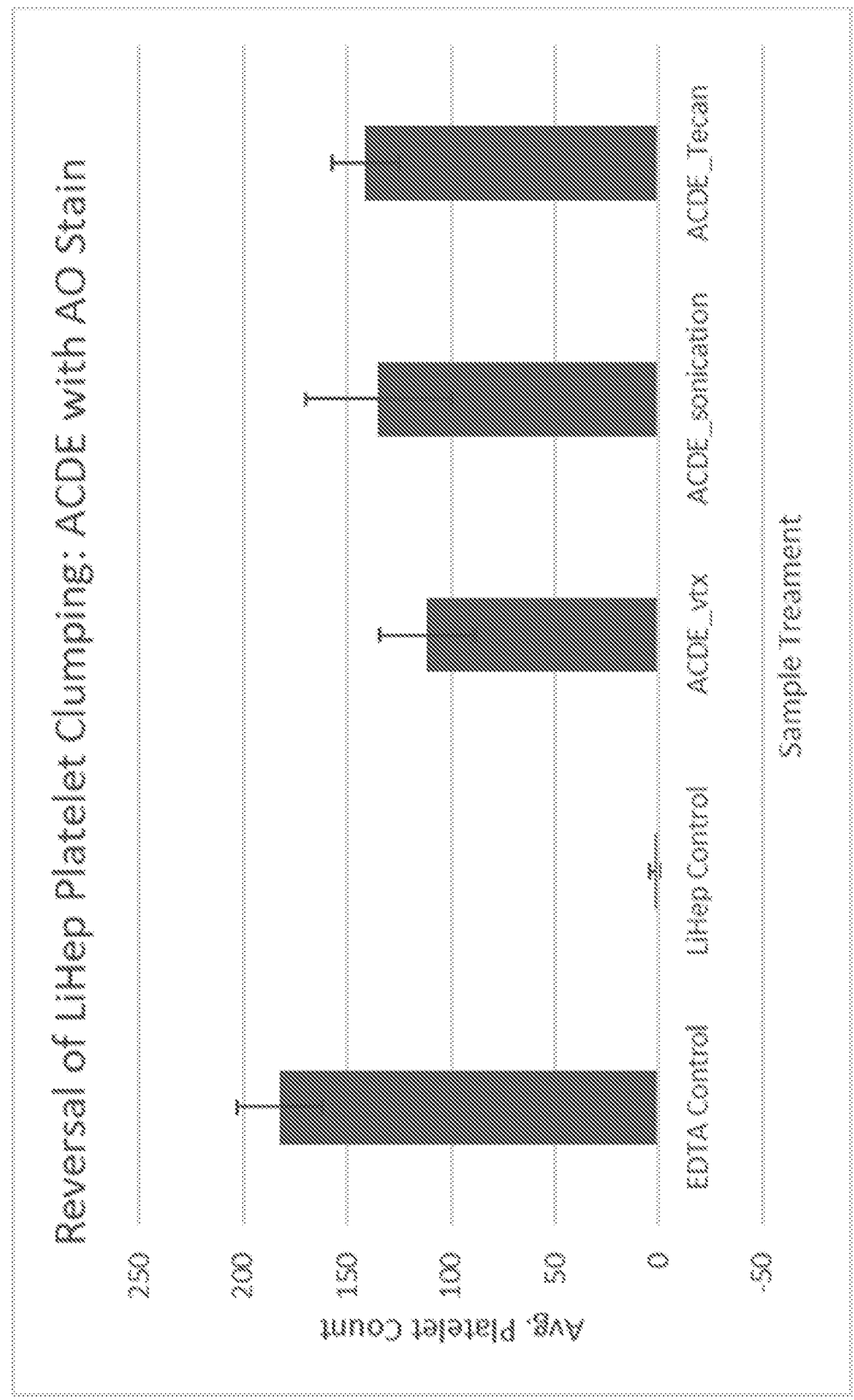
FIG. 5 shows a composition comprising EDTA and ACD (ACDE) increased dissolution of platelet clumps formed in blood samples as compared to EDTA alone. X axis indicates sample type; Y axis shows average platelet counts in blood samples per unit field of view. Samples stained with AO.

As shown in FIG. 5, when switched to AO staining, platelet recovery was near 80% in the samples.

Example 7

Increased ACD Concentration Improves the Clumping Reversal Effect

Further, increasing the ACD concentration resulted in a further increase in the recovery of platelet counts. Particularly, fresh venipuncture blood samples were collected into EDTA and LiHep blood collection tubes as described above. Concentrated EDTA was dried for at least one hour at room temperature in microcentrifuge tubes using a vacuum drying oven. Following collection, a 200 uL fraction of the LiHep sample was added to a tube containing dried EDTA reconstituted with ACD resulting in a final concentration of 9.7% ACD (vol/vol) and 18 mM EDTA in blood ("ACDE"). A second 200 uL LiHep fraction was added to a tube containing dried EDTA reconstituted with ACD resulting in a final concentration of 17.6% ACD (vol/vol) and 16.5 mM EDTA in blood ("ACDE-2x_vtx"). Both samples were pulse vortexed with three, ten-second bursts at the maximum vortex setting. Samples were then stained using acridine orange (AO). AO was added to blood sample at a final concentration of 10 ug/mL, pipette mixed and incubated for 5 minutes at room temperature. A standard blood smear was performed on all samples. A coverslip was placed on top of the sample immediately following the blood smear to prevent sample drying out. Cells were imaged using the fluorescence setting on an Echo Revolve™ microscope. AO is a pH-sensitive cationic dye. When bound to double-stranded DNA (for example, in the nuclear compartment), the dye fluoresces green with an excitation maximum at 502 nm and emission maximum at 525 nm. When bound to single stranded DNA and RNA (for example, in the cytoplasm) or when the dye is in an acidic environment (for example, in lysosomes), the dye fluoresces red with an excitation maximum at 460 nm and emission maximum at 650 nm. To capture the green fluorescence of AO, which labeled the nuclei of white blood cells, a blue LED light source with excitation filter at 470/40 nm was paired with emission filter at 525/50 nm, with a dichroic mirror at 495 nm. To capture the red fluorescence of AO, which labeled the cytoplasmic compartments of white blood cells, the same blue LED light source was paired with emission filter at 635/60 nm with a dichroic mirror at 600 nm. Between five to seven different fields of view were captured. Images were analyzed using Image J and the number of platelets present in each field of view was manually counted. Error bars indicate standard deviation of the data set.

Figure 6A:
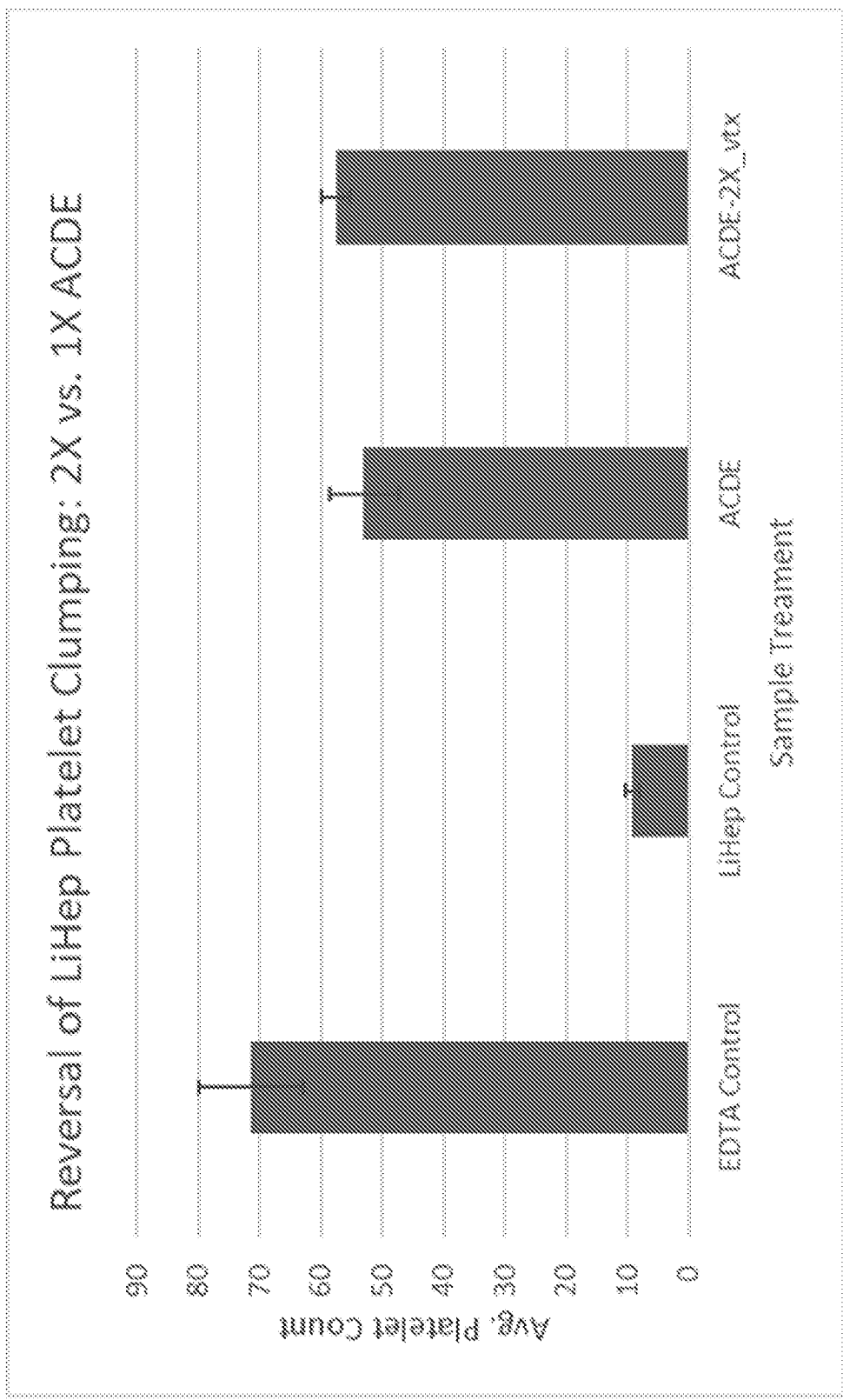
FIG. 6A shows that a composition containing a higher concentration of ACDE and a lower concentration of EDTA (ACDE-2×) produced better results in dissolution of platelet clumps formed in blood samples. X axis indicates sample type; Y axis shows average platelet counts in blood samples per unit field of view.
Figure 6B:
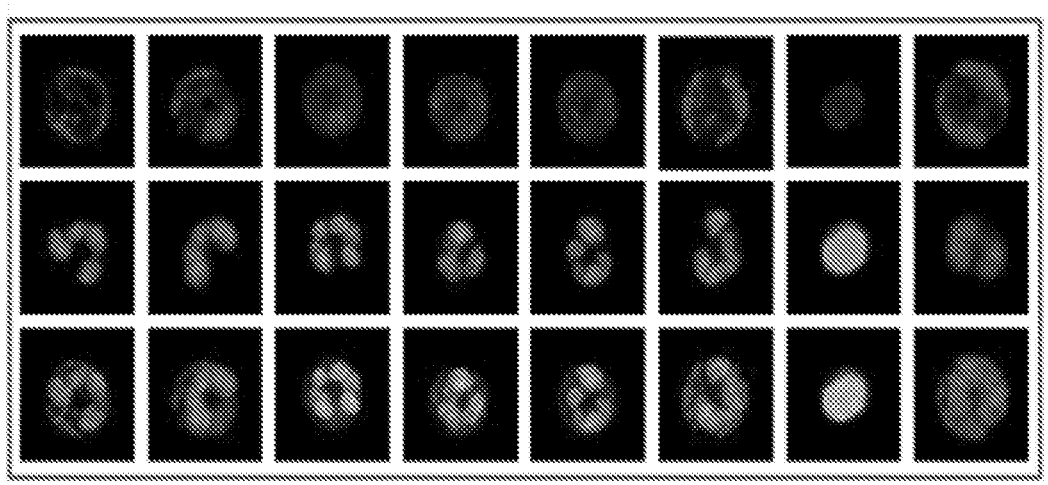
FIG. 6B shows that a composition containing a higher concentration of ACDE and a lower concentration of EDTA (ACDE-2×) did not negatively impact morphology of white blood cells. Samples stained with AO.
Figure 6B:
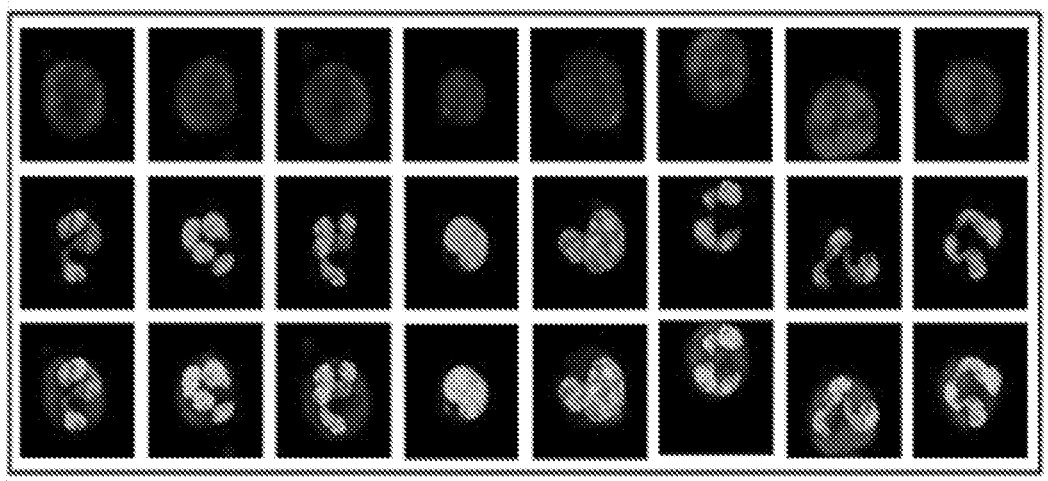
Figure 6C:
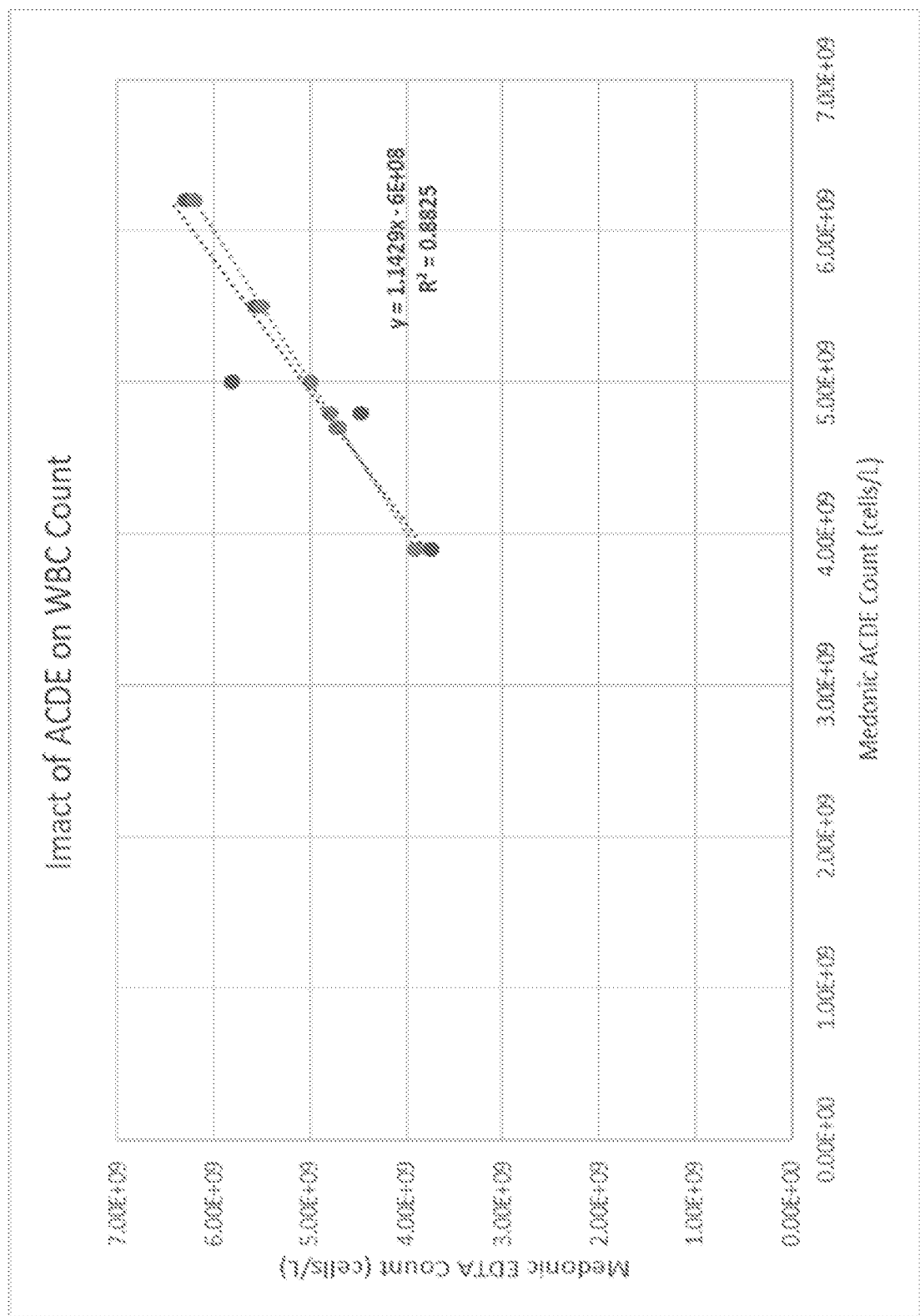
FIGS. 6C and 6D show that a composition containing a higher concentration of ACDE and a lower concentration of EDTA (ACDE-2×) did not negatively impact white blood cell count or red blood cell count as measured on Medonic™ hematology analyzer.
Figure 6D:

As shown in FIG. 6A, increasing the concentration of ACD in the "ACDE-2x_vtx" sample resulted in a further increase in platelet recovery (FIG. 6A) without compromising white blood cell morphology (FIG. 6B) or WBC and RBC cell count (FIGS. 6C and 6D). With the formulation having 16.5 mM EDTA and 17.6% ACD in 1xPBS, about 80% recovery of the total platelet count was achieved when analyzed using AO staining (FIG. 6A). Physical forces such as vortexing, sonication and pipetting can further dissolute platelet clumps formed in the blood sample.

Example 8

Alternate Calcium Chelators Reversed Platelet Clumping in LiHep Samples

The hypothesized mechanism for ACDE declump of LiHep samples is the calcium chelator activity of ACD and EDTA. As such, alternate calcium chelators were explored for similar declumping features. Citric acid, N,N-bis(carboxymethyl)glycine (NTA) and cyclam were among those tested that showed declumping activity.

To investigate the ability of citric acid to reverse platelet clumping, venipuncture blood samples were collected into EDTA and LiHep blood collection tubes as described above. LiHep blood samples were treated with ACDE as described above with a concentration of 17.6% ACD (vol/vol) and 16.5 mM EDTA in blood. A second 15 µL fraction of LiHep blood was treated with citric acid at a final concentration of 5 mM. To encourage platelet declump, samples were then vortexed. Samples were stained using acridine orange and imaged using an Echo Revolve™ Microscope at 20x magnification. Images were analyzed using Image J and the number of platelets present in each field of view (FOV) across 10 FOVs was manually counted.

Figure 7:
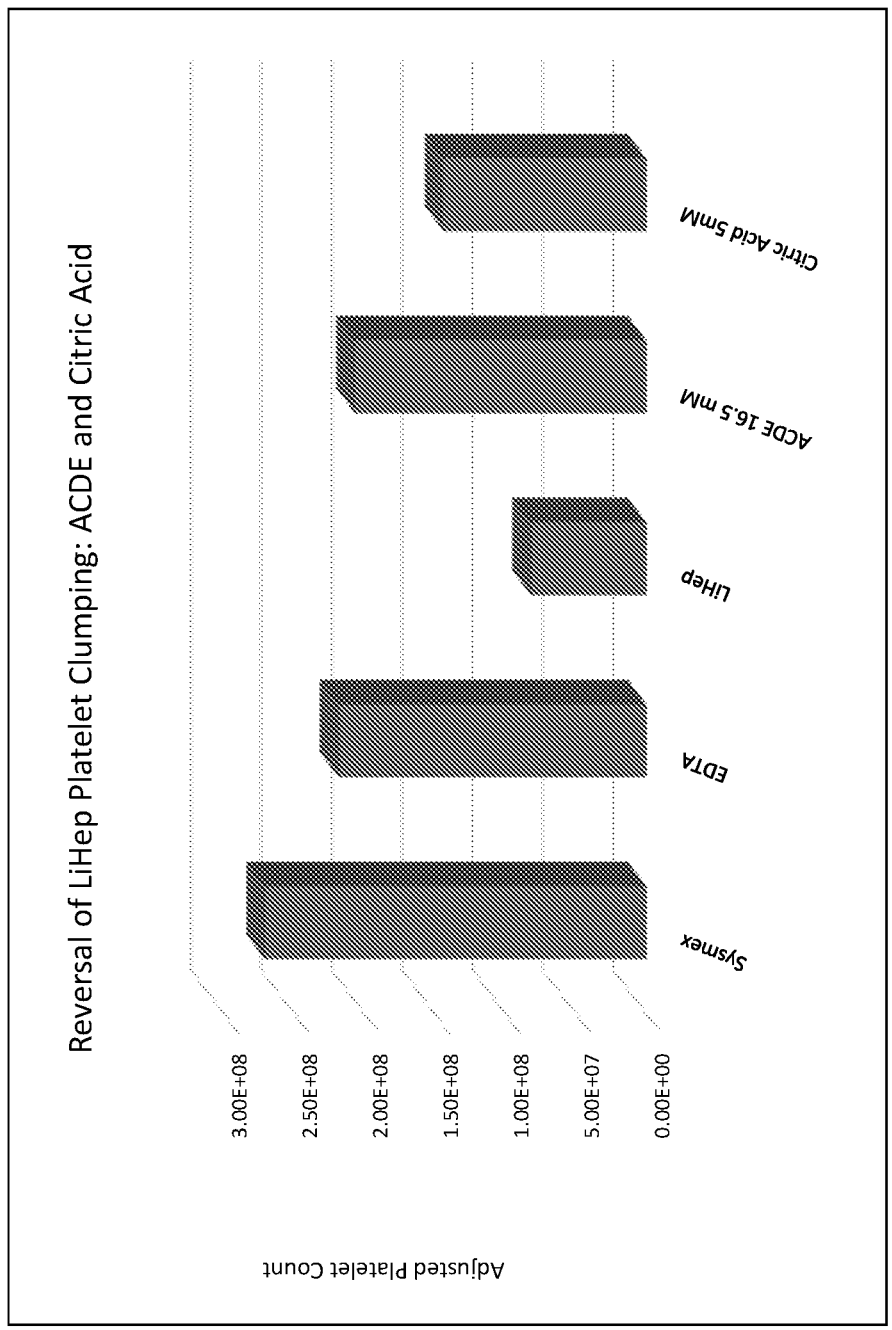
FIG. 7 shows that treatment of a LiHep blood sample with ACDE or citric acid results in an increase in platelet count due to a reversal of platelet clumping. Samples stained with AO.

As shown in FIG. 7, it was observed that treatment of LiHep blood sample with ACDE resulted in about 95% recovery of platelet counts ("ACDE"). The same blood sample treated with citric acid ("citric acid) resulted in 66% recovery of platelet counts. The EDTA control group and the LiHep control group were included for comparison.

The calcium chelators NTA and cyclam were next explored as alternate chelators to reverse platelet clumping in LiHep samples. Venipuncture blood samples were collected into EDTA and LiHep blood collection tubes as described above. A 15 µL aliquot of LiHep blood was treated with 5 mM NTA an vortexed vigorously. Another 15 µL aliquot of the same LiHep venipuncture sample was treated with cyclam and vortexed vigorously. Samples were stained using acridine orange and imaged at 20× magnification using an Echo Revolve Microscope. Images were analyzed using Image J and the number of platelets present in each FOV across 10 FOVs was manually counted.

Figure 8:
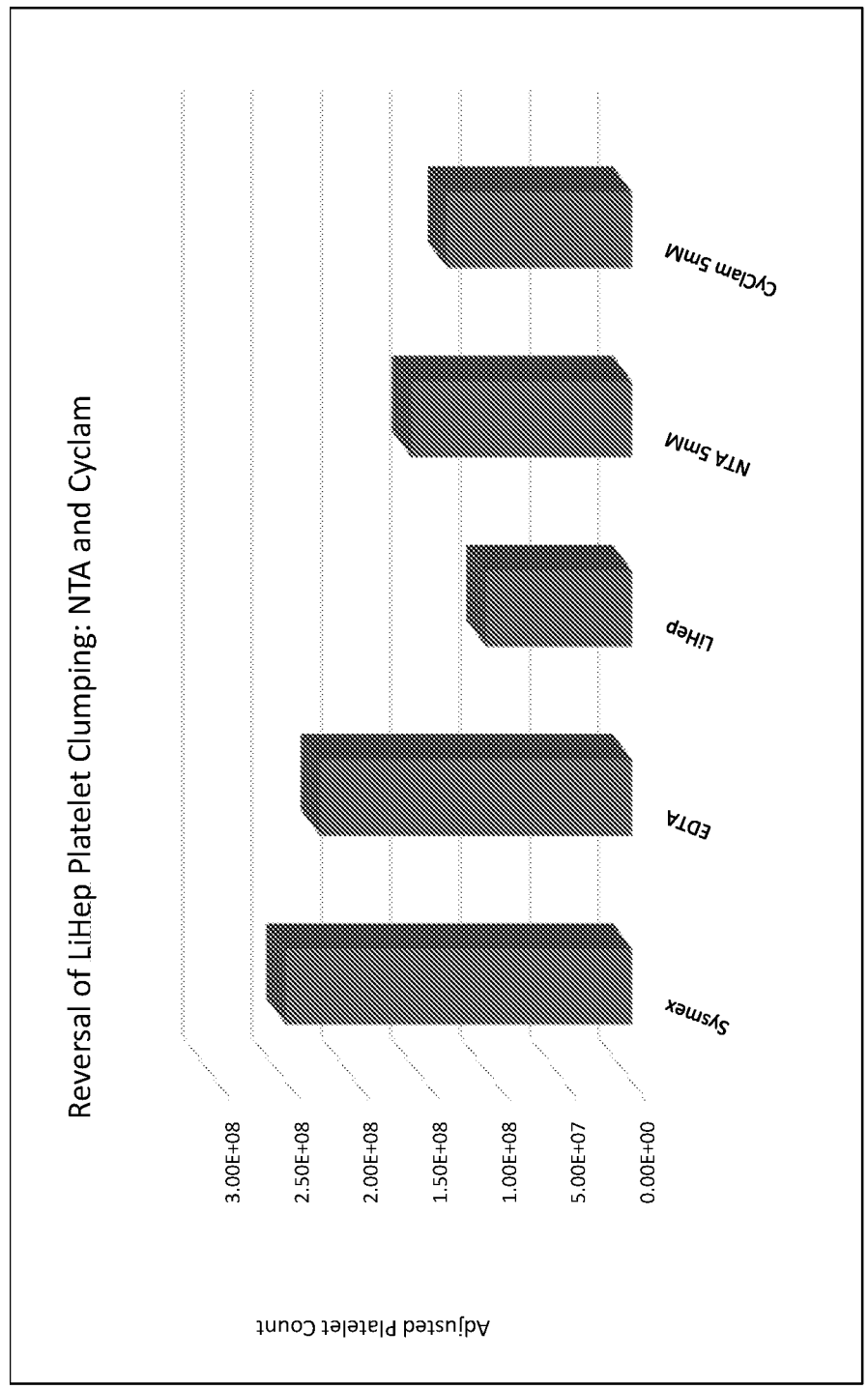
FIG. 8 shows that treatment of a LiHep blood sample with N,N-bis(carboxymethyl)glycine (NTA) or 1,4,8,11-tetraazacyclotetradecane (CYCLAM) results in an increase in platelet count due to a reversal of platelet clumping. Samples stained with AO.

FIG. 8 demonstrates that treatment of LiHep blood with NTA or cyclam results in 71% and 60% recovery of platelets respectively. The EDTA control group and the LiHep control group were included for comparison.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with embodiments related to the described subject matter. Although a few variations have been described in detail above, other modifications or additions are possible. For example, while the current subject matter is described as being used in connection with point of care (POC) blood characterization systems, it will be appreciated that the devices described herein can be used with other types of POC systems. In addition, the current subject matter can be used with characterization of other types of liquid samples (e.g., other biological fluids, environmental testing samples and the like). In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results.

Although the invention has been described with reference to the above examples, it will be understood that modifications and variations are encompassed within the spirit and scope of the invention. Accordingly, the invention is limited only by the following claims.

What is claimed is:

1. A method for dissolution of platelet clumps in a blood sample comprising collecting the blood sample in a heparin-containing container, allowing platelets in the blood sample to clump, and contacting the blood sample in the heparin-containing container with a chelator that reduces reactive Ca2+ from the blood sample thereby reversing platelet clumping, wherein the chelator is present at a concentration of less than about 50% by volume or about 60 mM.

2. The method of claim 1, wherein the heparin is lithium heparin (LiHep).

3. The method of claim 1, wherein the chelator comprises ethylenediaminetetraacetic acid (EDTA) or a salt thereof.

4. The method of claim 1, wherein the chelator comprises citric acid or a salt thereof.

5. The method of claim 1, wherein the contacting is performed by contacting the chelator with the blood sample containing platelet clumps.

6. The method of claim 1, wherein the chelator comprises citric acid or a salt thereof, and wherein the contacting is performed by contacting an acid citrate dextrose (ACD) solution with the blood sample to a final ACD concentration in the range of about 5% to 20% by volume.

7. The method of claim 1, wherein after the contacting the method further comprises applying a physical force to the blood sample.

8. The method of claim 7, wherein the physical force is vortexing, pipetting, sonication, acoustic mixing, and/or mechanical vibrating.

9. The method of claim 1, wherein the chelator comprises EDTA or a salt of EDTA, and citric acid or a salt of citric acid, and wherein the contacting is performed by contacting EDTA with the blood sample to a final EDTA concentration of about 18 mM and contacting the ACD solution with the blood sample to a final ACD concentration of about 9.7% by volume.

10. The method of claim 1, wherein the chelator comprises EDTA or a salt of EDTA, and citric acid or a salt of citric acid, and wherein the contacting is performed by contacting EDTA or the salt of EDTA with the blood sample to a final EDTA concentration of about 16.5 mM and contacting the ACD solution with the blood sample to a final ACD concentration of about 17.6% by volume.

11. The method of claim 1, wherein the chelator comprises EDTA or a salt thereof and the contacting is performed by contacting EDTA or a salt thereof with the blood sample to a final EDTA concentration of no more than about 20 mM.

12. The method of claim 11, wherein the contacting step is performed by contacting EDTA or a salt thereof with the blood sample to a final EDTA concentration of in the range of about 4 mM to 20 mM EDTA.

13. The method of claim 1, wherein the method improves accuracy of an assay.

14. The method of claim 13, wherein the assay is a complete blood count (CBC) assay, a red blood cell (RBC) count assay, a white blood cell (WBC) count assay, a white blood cell (WBC) differential assay, a platelet count assay or a mean platelet volume (MPV) assay.

15. The method of claim 1, wherein the method prevents a misdiagnosis of a condition.

16. The method of claim 15, wherein the misdiagnosis is pseudothrombocytopenia or pseudoleukocytosis.

17. A method for dissolution of platelet clumps in a blood sample comprising collecting the blood sample in a heparin-containing container, allowing platelets in the blood sample to clump, and contacting the blood sample in the heparin-containing container with a chelator that reduces reactive Ca2+ from the blood sample thereby reversing or preventing platelet clumping.

* * * * *